United States Patent
Casey et al.

(10) Patent No.: US 12,521,479 B2
(45) Date of Patent: Jan. 13, 2026

(54) ASPIRATION CONTROL VALVE

(71) Applicant: Neuravi Limited, Galway (IE)

(72) Inventors: Brendan Casey, Galway (IE); David Vale, Barna (IE); Michael Gilvarry, Headford (IE)

(73) Assignee: NEURAVI LIMITED, Galway (IE)

( * ) Notice: Subject to any disclaimer, the term of this patent is extended or adjusted under 35 U.S.C. 154(b) by 0 days.

(21) Appl. No.: 18/136,138

(22) Filed: Apr. 18, 2023

(65) Prior Publication Data

US 2023/0248894 A1 Aug. 10, 2023

Related U.S. Application Data

(63) Continuation of application No. 16/400,221, filed on May 1, 2019, now abandoned.

(51) Int. Cl.
*A61M 1/00* (2006.01)
*A61M 25/00* (2006.01)
(Continued)

(52) U.S. Cl.
CPC ...... *A61M 1/7413* (2021.05); *A61M 25/0097* (2013.01); *A61M 39/06* (2013.01); *A61M 39/0606* (2013.01); *A61B 17/22* (2013.01); *A61B 2017/22079* (2013.01); *A61M 2025/0681* (2013.01); *A61M 2039/0264* (2013.01); (Continued)

(58) Field of Classification Search
CPC ... A61B 2017/22079; A61B 2217/005; A61M 2039/0264; A61M 2039/0273; A61M 2039/062; A61M 2205/3334; A61M 1/7415; A61M 39/22; A61M 39/06; (Continued)

(56) References Cited

U.S. PATENT DOCUMENTS 5,158,553 A * 10/1992 Berry ................ A61B 17/3462
604/167.03
5,336,172 A 8/1994 Bales et al.
(Continued)

FOREIGN PATENT DOCUMENTS

DE  10 2010 035735 A1  3/2012
GB      2352797 A  *  2/2001  ......... A61B 17/3498
WO  2008/078393 A1  7/2008

OTHER PUBLICATIONS

Extended European Search Report issued in corresponding European Patent Application No. 20 17, 2255 dated Jul. 21, 2020.
(Continued)

*Primary Examiner* — William R Carpenter
*Assistant Examiner* — Robert F Allen
(74) *Attorney, Agent, or Firm* — Troutman Pepper Locke LLP

(57) ABSTRACT

An aspiration control device can have an aspiration control valve and a switch, button, slider, trigger, grip, lever, rotating wheel, rotating valve, handle or other interface for resizing the aspiration control valve. The aspiration control interface can be conveniently positioned and configured to be manipulated while simultaneously stabilizing a catheter and/or retracting an elongated member. The aspiration control device can be integrated with a hemostasis valve, integrated with a wire gripping device, and/or attached to an inlet, outlet, hose, pump, or syringe in series with an aspiration flow path.

7 Claims, 16 Drawing Sheets

(51) Int. Cl.
*A61M 25/06* (2006.01)
*A61M 39/02* (2006.01)
*A61M 39/06* (2006.01)
*A61B 17/22* (2006.01)

(52) U.S. Cl.
CPC .............. *A61M 2039/0273* (2013.01); *A61M 2039/062* (2013.01); *A61M 2202/0413* (2013.01); *A61M 2205/3334* (2013.01); *A61M 2205/586* (2013.01)

(58) Field of Classification Search
CPC .. A61M 1/734; A61M 2205/583; A61M 1/74; A61M 1/732; A61M 2039/0673
See application file for complete search history.

(56) References Cited

U.S. PATENT DOCUMENTS

| | | | |
|---|---|---|---|
| 6,001,112 A | 12/1999 | Taylor | |
| 6,843,779 B1 | 1/2005 | Andrysiak et al. | |
| 6,929,236 B1 | 8/2005 | Height | |
| 7,229,462 B2 | 6/2007 | Sutton et al. | |
| 7,316,702 B2 | 1/2008 | Joergensen et al. | |
| 8,267,956 B2 | 9/2012 | Salahieh et al. | |
| 8,372,108 B2 | 2/2013 | Lashinski | |
| 8,491,541 B2 | 7/2013 | Graham | |
| 8,795,322 B2 | 8/2014 | Cully et al. | |
| 8,801,750 B2 | 8/2014 | Cully et al. | |
| 9,198,690 B2 | 12/2015 | Steinmetz | |
| 9,220,522 B2 | 12/2015 | Fulkerson et al. | |
| 9,283,066 B2 | 3/2016 | Hopkins et al. | |
| 9,345,565 B2 | 5/2016 | Fifer et al. | |
| 9,492,264 B2 | 11/2016 | Fifer et al. | |
| 9,597,101 B2 * | 3/2017 | Galdonik | A61B 17/221 |
| 9,943,395 B2 | 4/2018 | Fifer et al. | |
| 9,943,396 B2 | 4/2018 | Galdonik et al. | |
| 9,980,805 B2 | 5/2018 | Fifer et al. | |
| 10,058,411 B2 | 8/2018 | Fifer et al. | |
| 2006/0282155 A1 * | 12/2006 | Fearn | A61M 39/0613 623/1.12 |
| 2011/0046655 A1 | 2/2011 | Arnott et al. | |
| 2011/0319917 A1 | 12/2011 | Ferrera | |
| 2012/0310166 A1 | 12/2012 | Huff | |
| 2013/0035628 A1 * | 2/2013 | Garrison | A61B 17/221 604/9 |
| 2013/0237925 A1 | 9/2013 | Trainer | |
| 2013/0281788 A1 * | 10/2013 | Garrison | A61M 60/43 606/127 |
| 2014/0163603 A1 | 6/2014 | Zajarias | |
| 2015/0173782 A1 * | 6/2015 | Garrison | A61M 29/00 606/127 |
| 2015/0359547 A1 * | 12/2015 | Vale | A61M 1/74 606/115 |
| 2016/0058988 A1 | 3/2016 | Kesten | |
| 2016/0220265 A1 | 8/2016 | Pokorney et al. | |
| 2016/0256180 A1 * | 9/2016 | Vale | A61M 1/84 |
| 2016/0296690 A1 * | 10/2016 | Kume | A61M 1/3656 |
| 2017/0056032 A1 | 3/2017 | Look | |
| 2017/0105743 A1 * | 4/2017 | Vale | A61B 17/22032 |
| 2019/0328411 A1 * | 10/2019 | Vale | A61M 25/0082 |
| 2020/0022712 A1 * | 1/2020 | Deville | A61B 17/22 |

OTHER PUBLICATIONS

"The World's Fastest Dictionary." Vocabulary.com, www.vocabulary.com/sictionary/iris diaphragm. Date Accessed: Dec. 15, 2020 (Year: 2020).

Chinese Office Action dated Aug. 5, 2024, issued in corresponding CN Appin. No. 202010355931.9, and submitted 1 with English Translation.

Korean office action dated Feb. 13, 2025, corresponding to Korean Patent Appln. No. 10-2020-0051983, and submitted with English Translation.

* cited by examiner

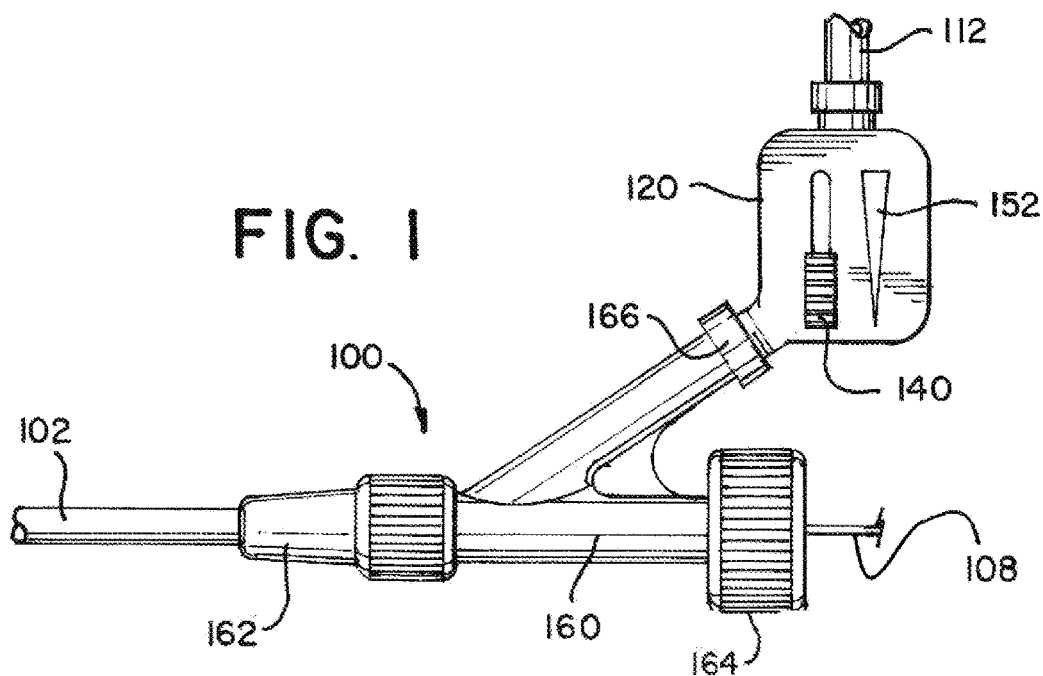
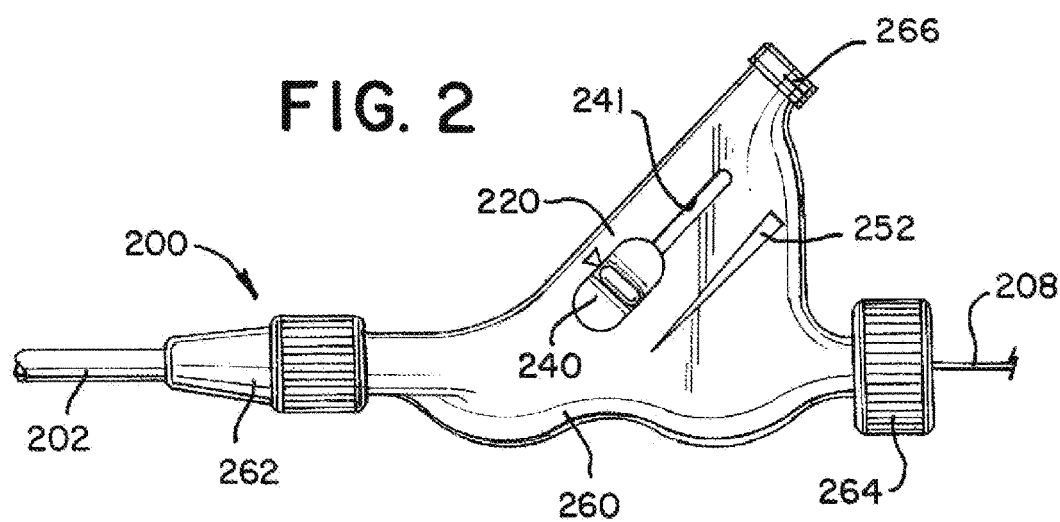
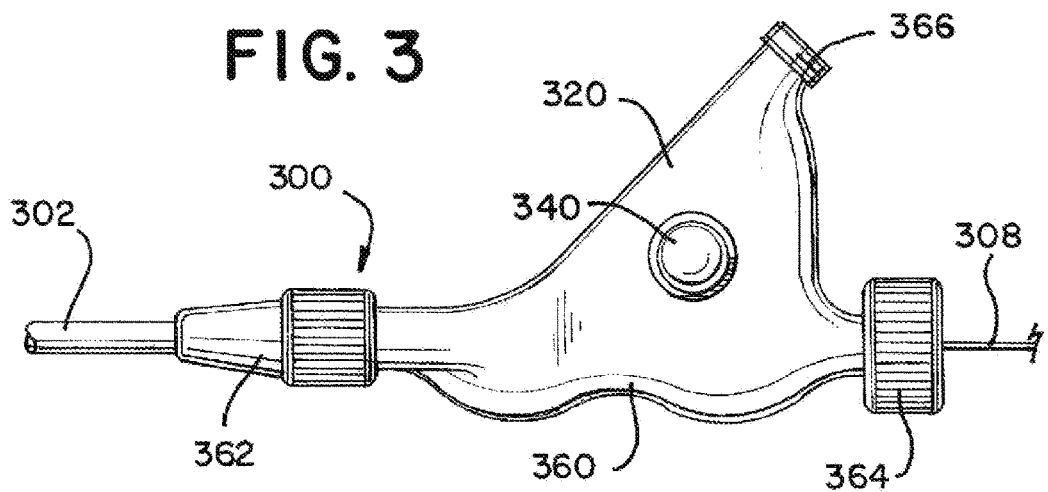

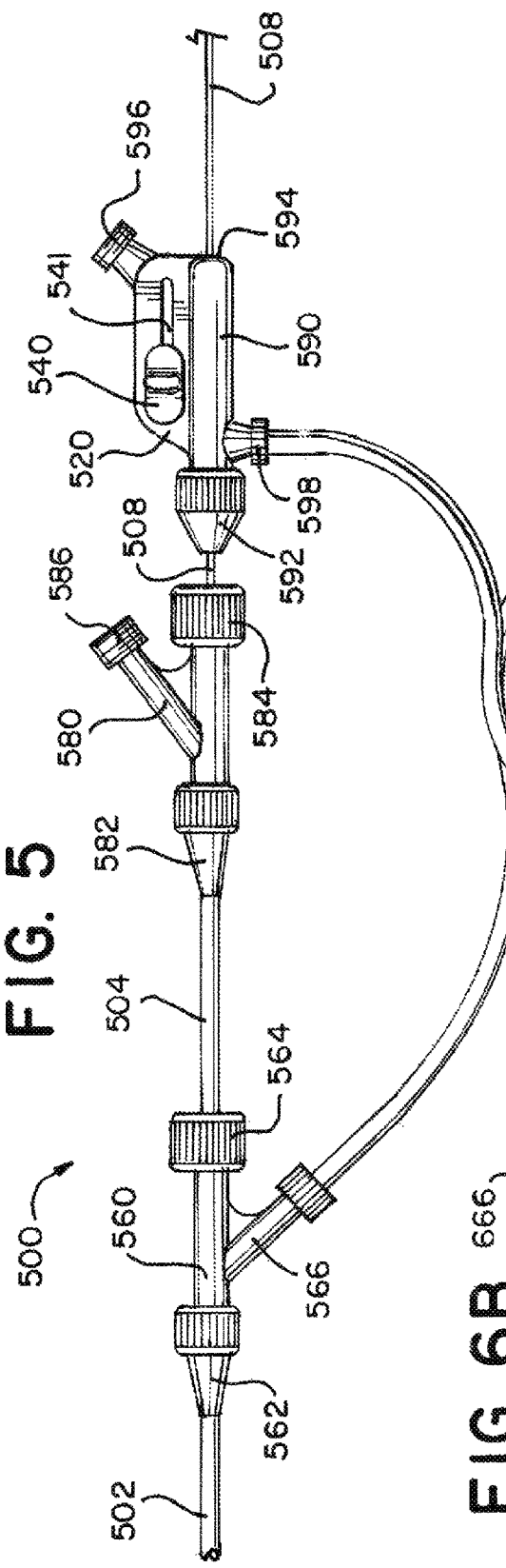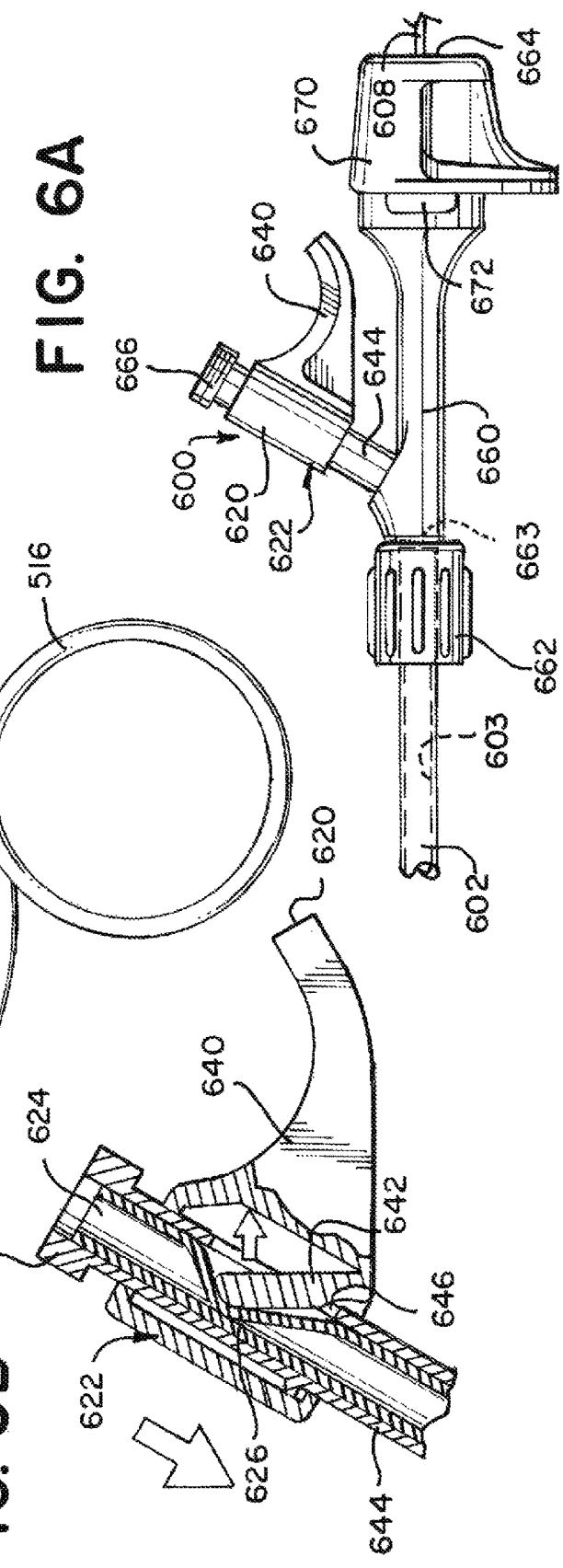

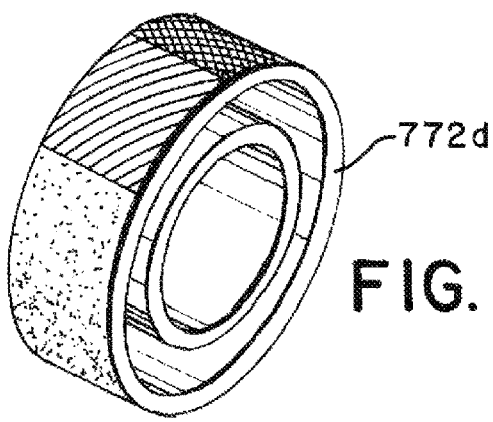
FIG. 7F
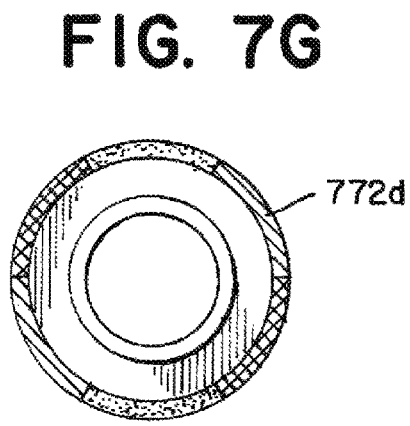
FIG. 7G
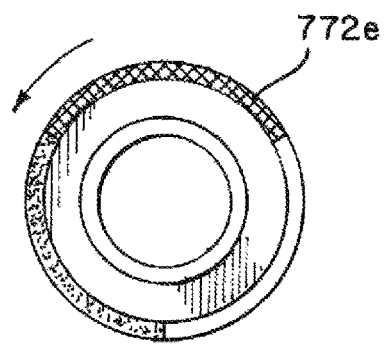
FIG. 7H
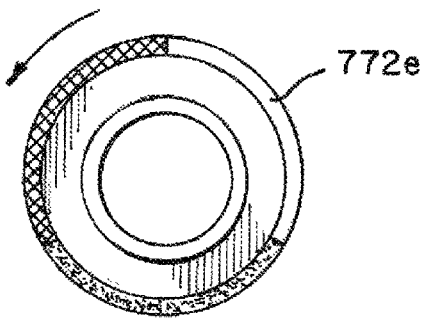
FIG. 7I
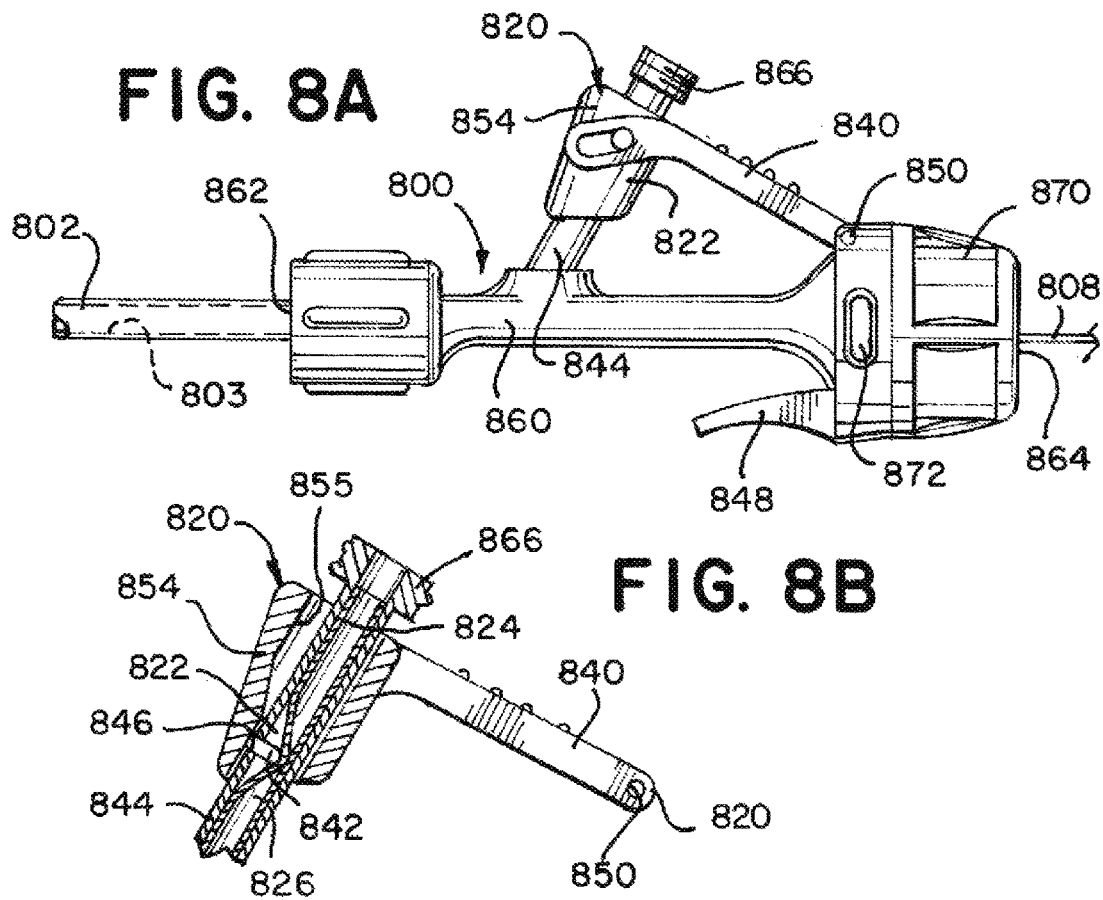
FIG. 8A
FIG. 8B

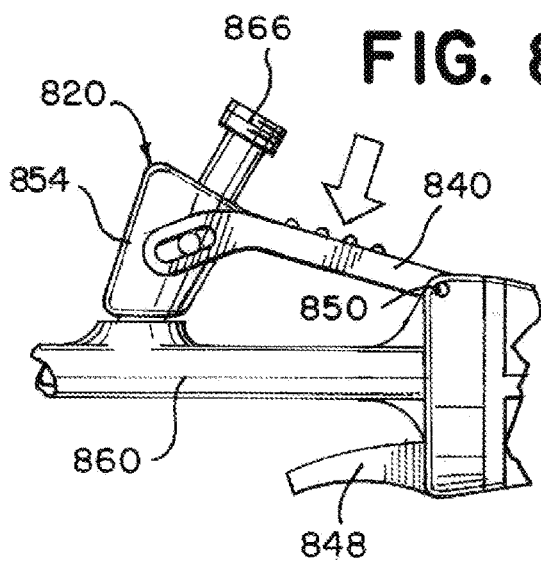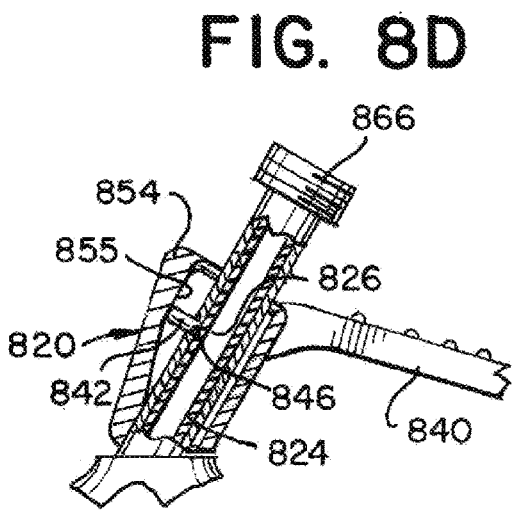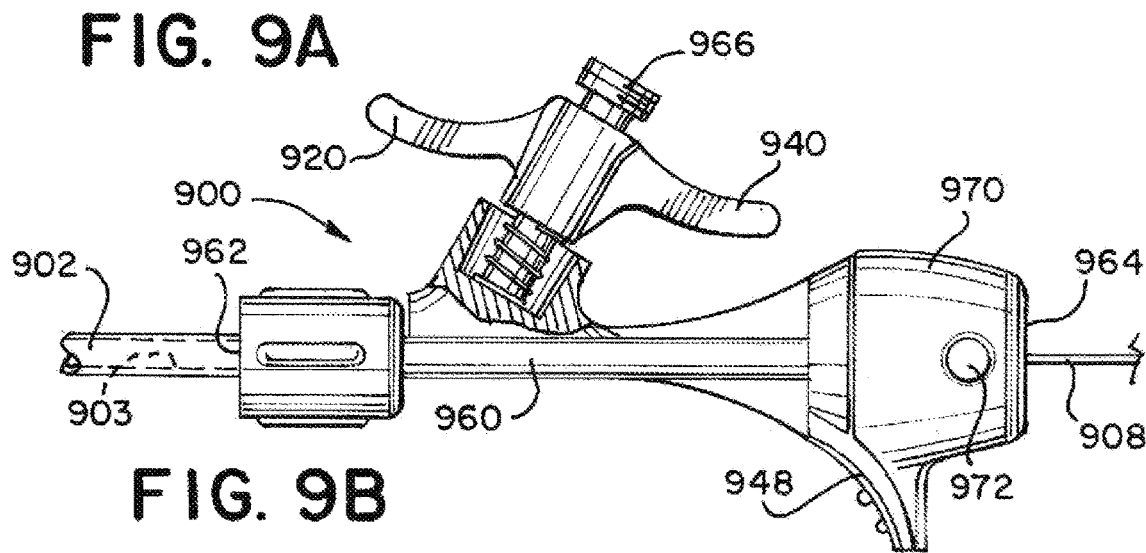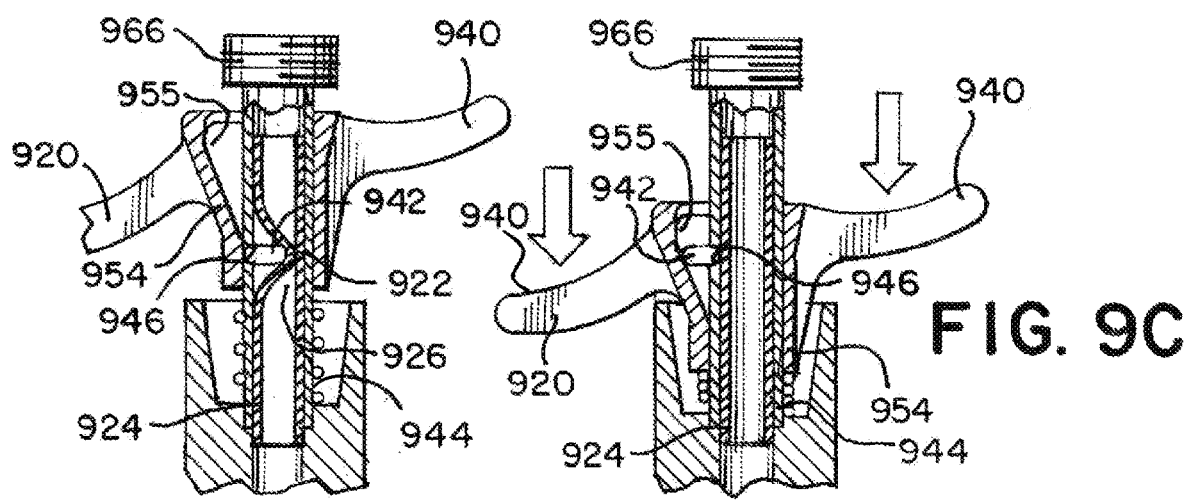

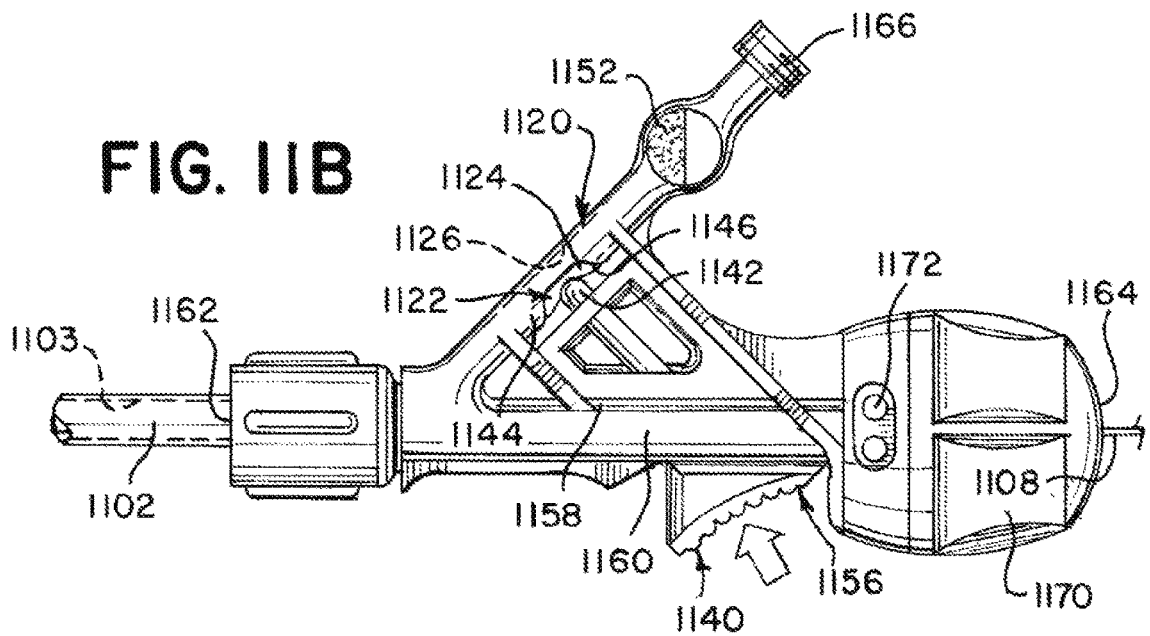
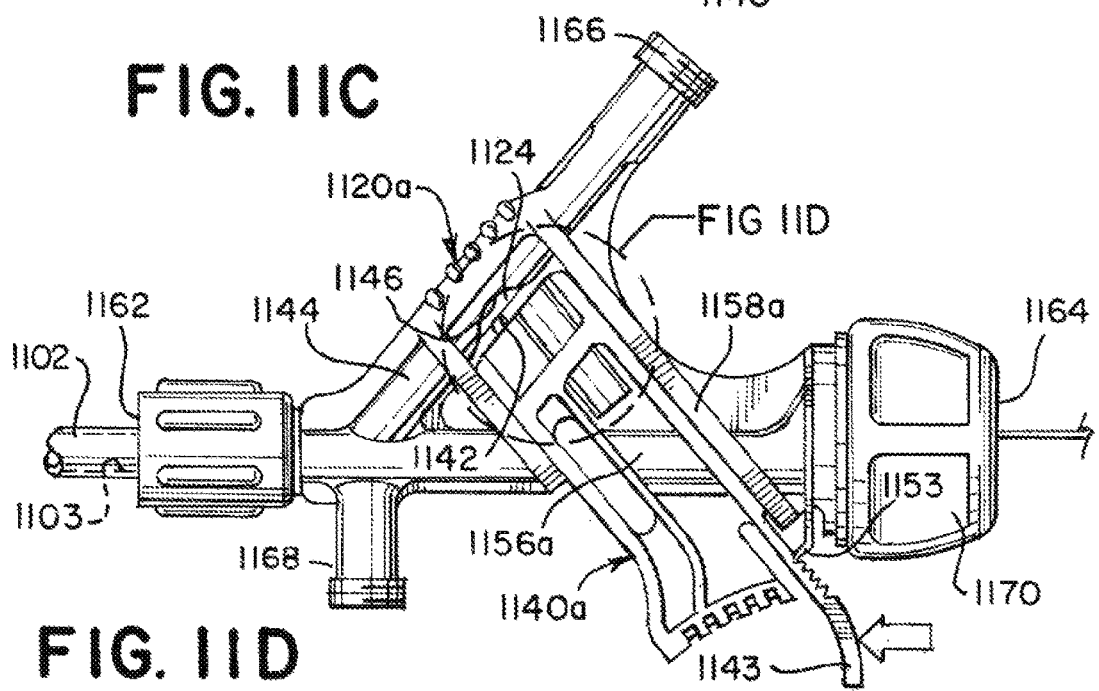
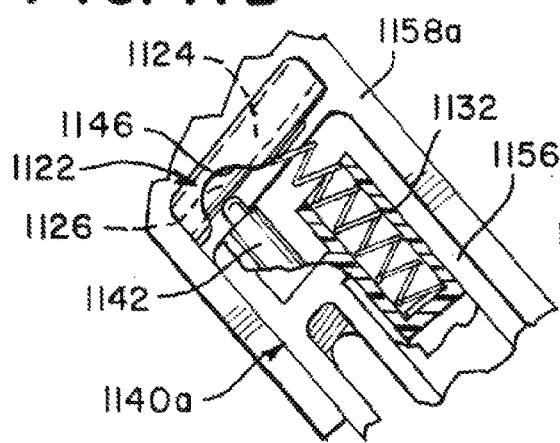
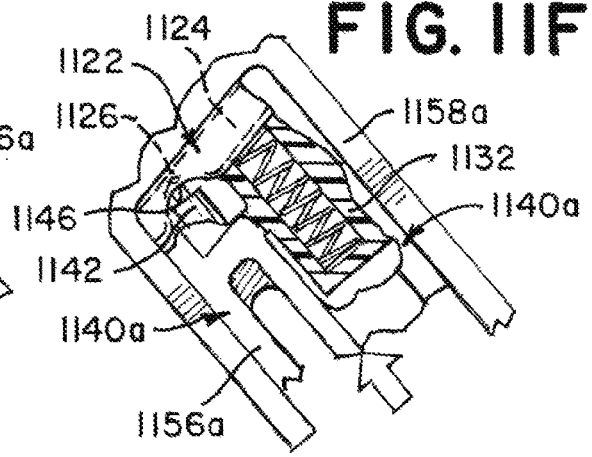

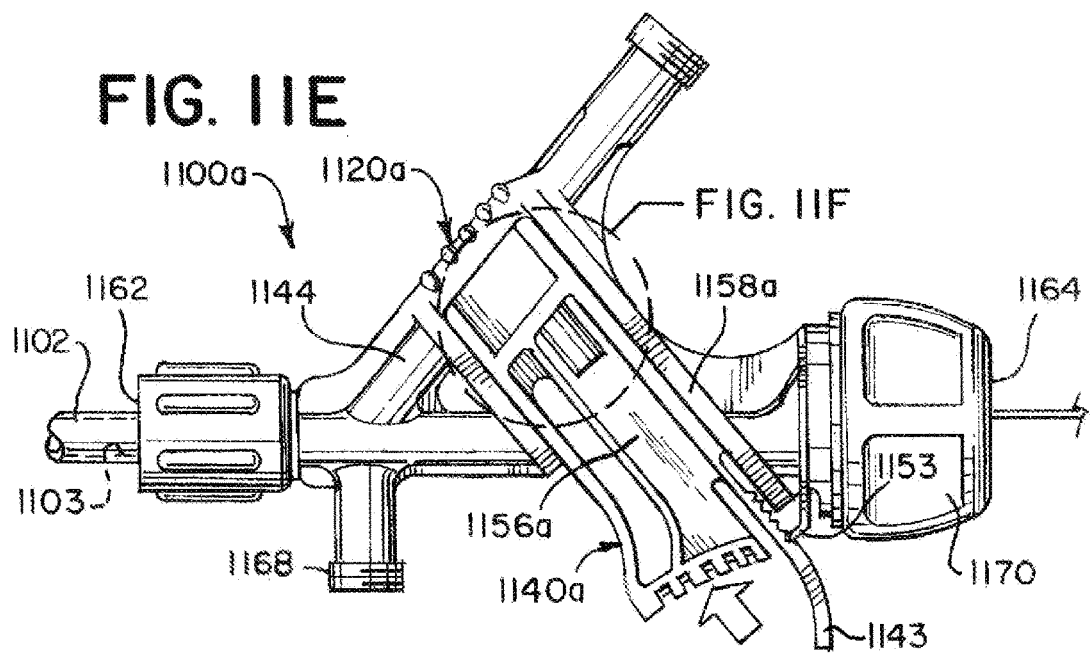
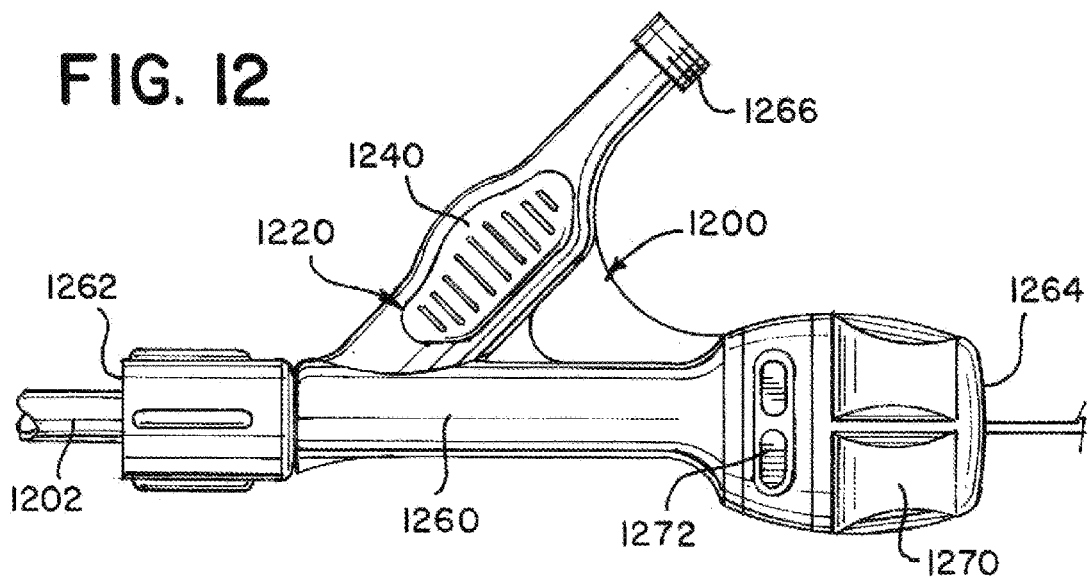
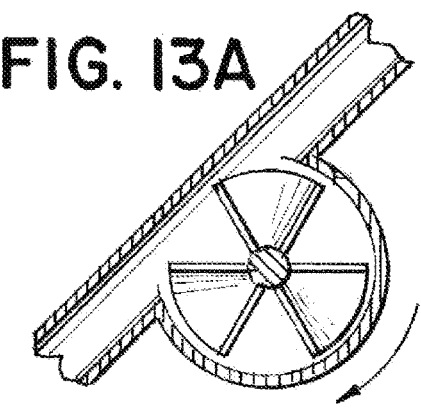
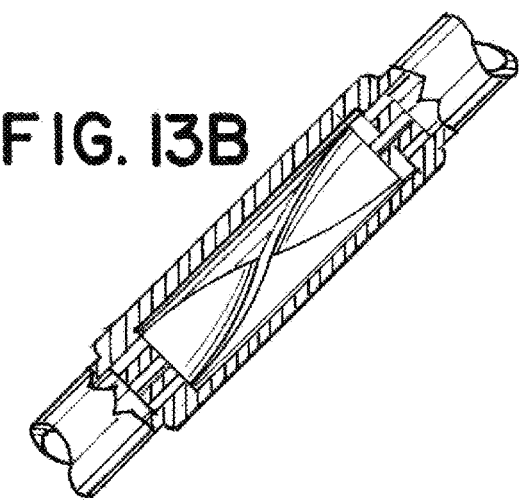

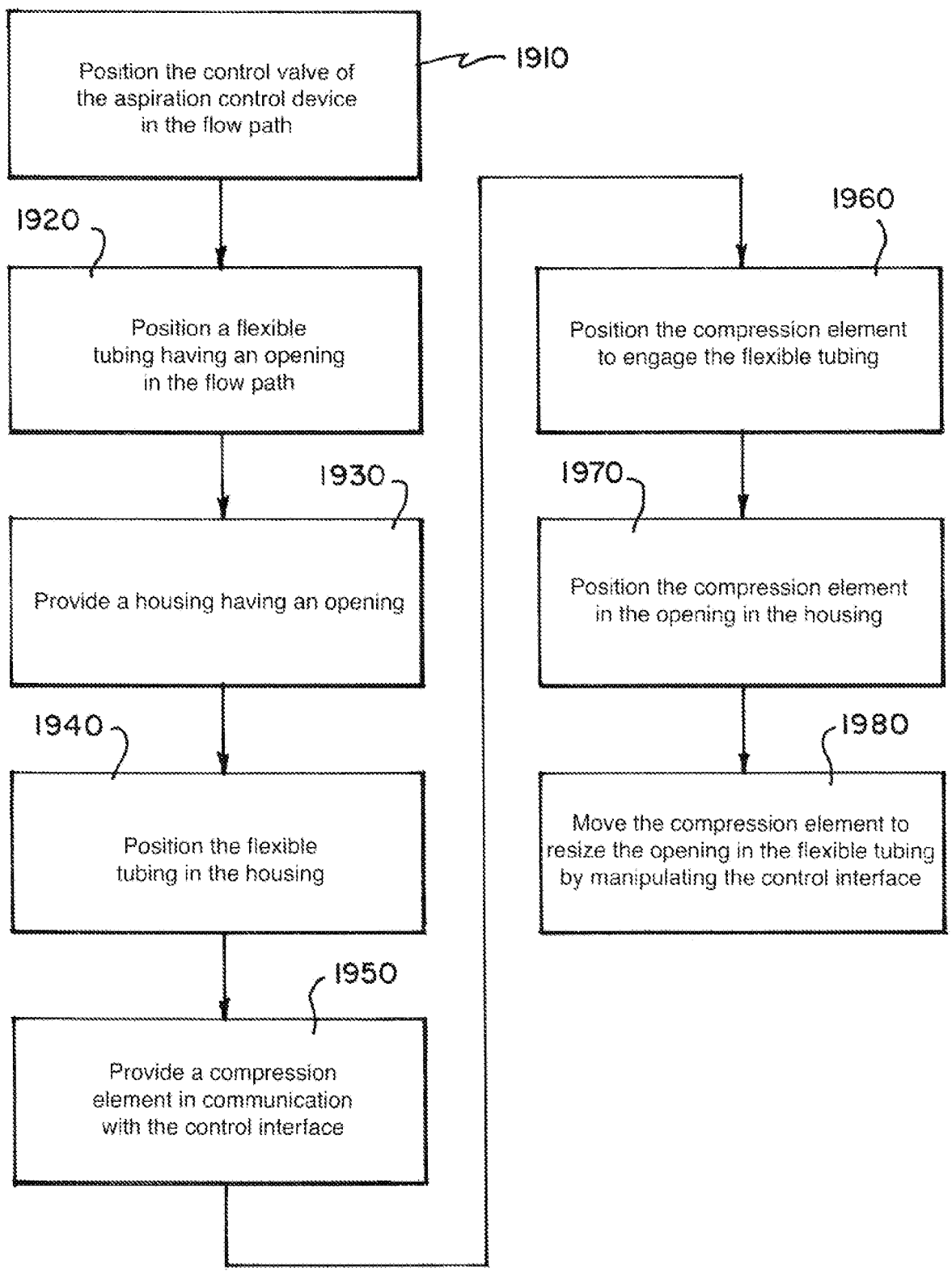

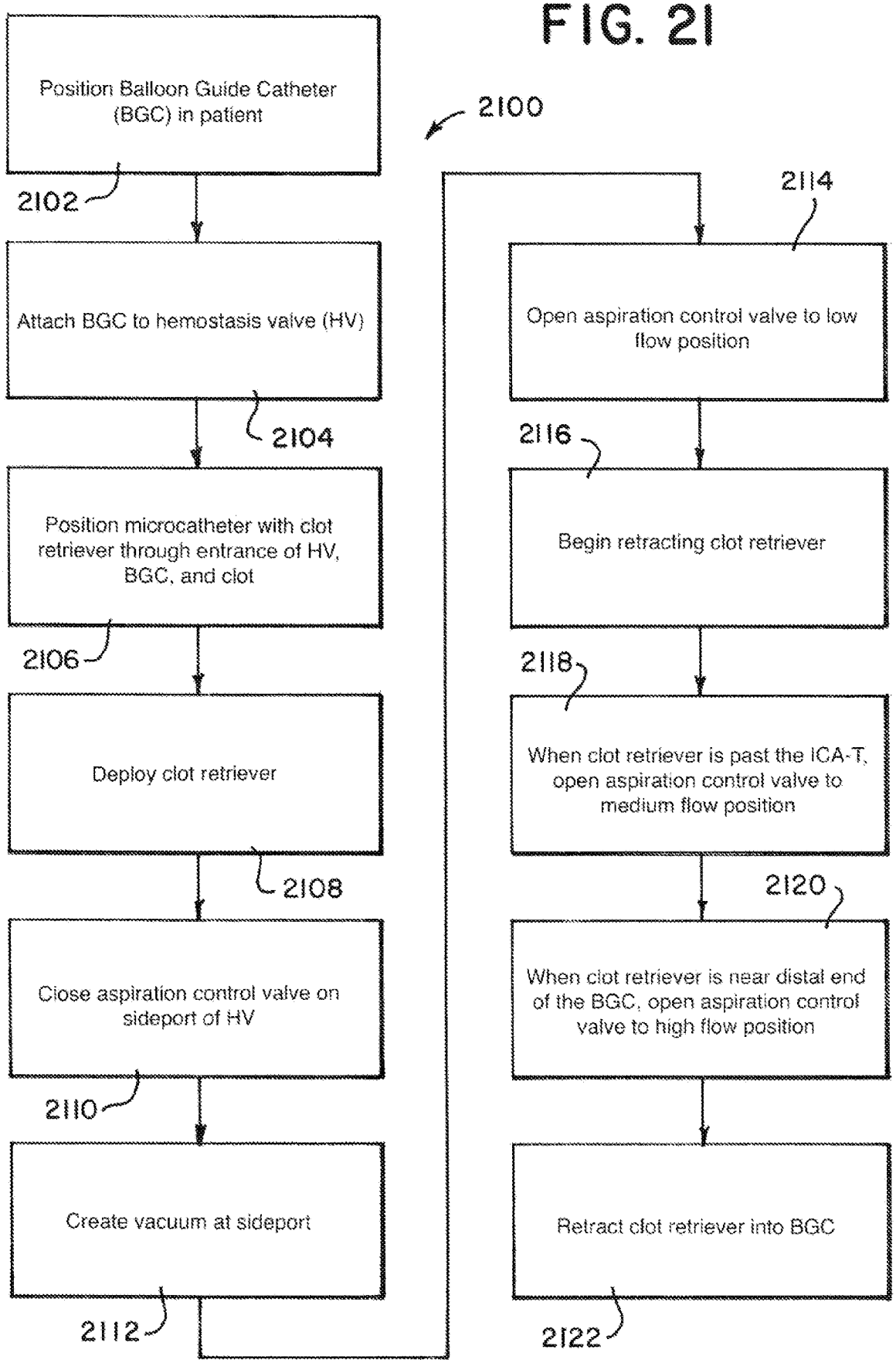

ASPIRATION CONTROL VALVE

CROSS-REFERENCE TO RELATED APPLICATIONS

The present application is a continuation application of U.S. application Ser. No. 16/400,221, filed on May 1, 2019, which is incorporated herein by reference in its entirety as if fully set forth below.

FIELD OF INVENTION

The present invention generally relates to intravascular medical treatments, and more particularly, to regulating aspirated blood flow rate during a thrombectomy procedure.

BACKGROUND

During intravascular medical treatments it can be advantageous to slow or reverse blood flow at a treatment site within a patient. During a thrombectomy, for example, a physician can utilize a syringe or a vacuum pump to obtain reverse blood flow to aid in dislodgement and retrieval of a blood clot or thrombus in conjunction with a stentriever or for direct aspiration into an Intermediate or Access Catheter. The syringe or vacuum pump can be connected to the proximal end of the Intermediate or Guide Catheter (e.g. Balloon Guide Catheter) and the vacuum can communicate with the distal tip of the catheter through the lumen of the catheter. The syringe and vacuum pump are typically connected to the side arm of a "Rotating Hemostasis Valve" which is attached to the proximal end of the Intermediate or Guide Catheter. "Rotating" refers to a luer connection which can be screwed onto the proximal end of the catheter and can be free to rotate for ease of attachment, while the hemostasis feature facilitates the introduction of other catheters and accessory devices through the Intermediate or Guide Catheter while minimizing back bleed and blood loss. The hemostasis valve typically contains a gasket which may be fully open for device introduction or tightened to prevent any blood loss. The gasket can also be tightened to grip a guidewire or microcatheter which is positioned inside the Intermediate or Guide Catheter. Known hemostasis valves typically include an entrance passageway for receiving the accessory devices or catheters in a hemostatically sealed condition and a side port which can be used for connecting a saline flush, injections such as contrast media or to which the aspiration syringe or vacuum pump can be attached.

Known hemostasis values can also include a passageway through which a guidewire, microcatheter, Intermediate Catheter, device shaft, or such elongated member can pass. The passageway can include a gasket for hemostatically sealing the exterior perimeter of the inner elongated member to minimize blood loss and grip the inner elongated member in position where required.

During a thrombectomy procedure, a syringe or vacuum pump can provide suction through a lumen of an Intermediate or Guide Catheter to produce reverse blood flow at the blood clot. When a vacuum pump is used, it is typically set to maximum and applies full vacuum/aspiration as the clot is being retrieved. Similarly, if a vacuum lock syringe is used, full vacuum is typically applied to give the maximum reverse flow rate for as long as possible until the syringe is full.

In some procedures, a physician can desire to modify the aspiration rate during the procedure to suit specific aspects of a clinical case. For example, during a thrombectomy, a physician might prefer to aspirate slowly on initial clot dislodgement, then increase suction when the clot is approaching the catheter, and then further increase suction to maximum when pulling the clot into the catheter. Increasing aspiration during clot retrieval can reduce the chance of vessel collapse due to negative pressure in the vasculature, and when performed with a syringe, can more effectively utilize the fixed volume of the syringe compared to a steadily applied vacuum. This technique requires simultaneous manipulation of the syringe or pump, retraction of the thrombectomy device, and stabilization of the catheter, which can be extremely difficult with traditional systems.

There is therefore a need for improved methods, devices, and systems for controlling aspiration during thrombectomy procedures. Similarly, control of aspiration flow rates is potentially beneficial in other intravascular or medical treatments where an aspiration pump or suction syringe is used.

SUMMARY

It is an object of the present invention to provide systems, devices, and methods to meet the above-stated needs. Generally, it is an object of the present invention to provide an aspiration control device having an aspiration control valve controllable by a switch, button, slider, trigger, grip, lever, rotating wheel, rotating valve, handle or other interface that is conveniently positioned and configured to be manipulated while simultaneously stabilizing a hemostasis valve and catheter in one hand and/or retracting an elongated member with the other hand. The aspiration control device can be integrated into a hemostasis valve, integrated into a wire gripping device, and/or attached to an inlet, outlet, hose, pump, or syringe in series with an aspiration flow path. Systems for aspirating blood flow during an intravascular procedure can include combinations of one or more aspiration control devices, one or more hemostasis valves, one or more wire gripping devices, and/or one or more vacuum sources to provide and/or regulate vacuum to one or more catheters.

An example system can include a hemostasis valve, a control valve, and a control interface. The hemostasis valve can have an entrance for receiving a catheter. The control valve can be in communication with the hemostasis valve and can have an opening resizable from a first dimension to a second dimension, the first dimension sized to limit flow of aspirated blood from the catheter at a first flow rate, and the second dimension sized to limit flow of aspirated blood from the catheter at a second flow rate. The control interface can be in communication with the control valve, and the control interface can be movable to move the opening of the control valve from the first dimension to the second dimension.

The hemostasis valve can further include a side port. The control valve can be positioned approximate the side port. The control valve can be positioned to prove a flow path for the flow of aspirated blood, the flow path extending from the catheter, through the control valve, and to the side port. The control valve and the control interface can be integrated with the hemostasis valve in a common housing.

The control interface can be positioned to allow a user to select one of the first flow rate or the second flow rate with a single hand while stabilizing the catheter with the same hand. The control interface can be a button configured to select at least one of the first flow rate or the second flow rate based at least in part on a force applied to the control interface. The opening of the control valve can be movable through a continuum of dimensions between the first dimension and the second dimension such that flow of aspirated blood is controllable over a continuum of flow rates between the first flow rate and the second flow rate. The control interface can be movable through a continuum of positions to move the opening of the control valve through the continuum of dimensions. The control interface can be spring loaded and can be set in a default open or default closed position or be ratcheted to be set at any interim position between fully open and fully closed.

The hemostasis valve can further include an exit sized to pass an inner elongated member, a seal disposed near the exit, a locking actuator displaceable to open, semi-open, or close the seal, and a hemostatic indicator movable to provide a visual indication of a position of the locking actuator. The inner elongated member can be disposed within a lumen of the catheter. The locking actuator can be displaceable from a first position, a second position, and a third position, each position corresponding to the open, semi-open, or closed state of the seal respectively. The hemostatic indicator can be movable to indicate which position the locking actuator is currently in. When the locking actuator is in the semi-open position, the inner elongated member can be retracted or moved in the catheter while the seal provides sufficient sealing to prevent air ingress when vacuum is applied to the side port during aspiration. During a thrombectomy procedure the inner elongated member can be a microcatheter and a stentriever can be retracted to retrieve the clot into the catheter when the catheter is under full vacuum without air leakage through the seal of the locking actuator.

An example apparatus can include a distal port, a proximal port, a first side port, a first flow path, a control valve, and a control interface. The distal port can be sized to receive a catheter. The proximal port can be sized to allow passage of an inner elongated member, the inner elongated member being disposed within a lumen of the catheter. The first flow path can extend from the lumen of the catheter to the first side port. The control valve can be in communication with the lumen of the catheter and the first side port, and the control valve can be movable to control blood flow through the first flow path. The control interface can be in communication with the control valve, and the control interface can be movable between at least two positions, the at least two positions corresponding to at least two flow rates of the blood flow through the first flow path.

The control interface can have a slide button positioned to allow a user to simultaneously select one of the two or more positions with a single hand while also stabilizing the catheter with the single hand.

The control interface can have a push button, and the push button can be pushed by a force to move the push button between the two or more positions while simultaneously stabilizing the catheter with the single hand.

The apparatus can further include a second side port and a second flow path. The second flow path can extend from the second side port to the first side port. The control valve can be in communication with the second side port and the first side port, and the control valve can be movable to control the blood flow through the second flow path.

An example method for aspirating blood flow can include some or all of the following steps and variations thereof. The steps are recited in no particular order. A hemostasis valve having a distal port and a side port can be provided. An aspiration control device having a control valve and a control interface can be provided. The aspiration control device can be positioned approximate the side port. The hemostasis valve and the aspiration control valve can be disposed in a common housing.

A flow path from a lumen of a catheter positioned in the distal port to the side port can be provided. The control valve of the aspiration control device can be positioned in the flow path. A flexible tubing having an opening can be positioned in the flow path. A housing having an opening can be provided. The flexible tubing can be positioned in the housing. A compression element in communication with the control interface can be provided. The compression element can be positioned to engage the flexible tubing. The compression element can be positioned in the opening in the housing. The compression element can be moved to resize the opening of the flexible tubing by manipulating the control interface.

The catheter can be provided, and the catheter can be positioned in the distal port. A vacuum source can be provided. A vacuum can be provided to the flow path with the vacuum source. The control interface can be manipulated to control a flow rate through the flow path. To manipulate the control interface, a force can be applied to the control interface and the control interface can be moved from an initial position by applying the force to the control interface. The catheter can be stabilized with a first hand while simultaneously manipulating the control interface with the single hand. The control interface can be released. The control interface can be returned to the initial position.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

FIG. 1 is an illustration of an aspiration control device connected to a hemostasis valve according to aspects of the present invention;

FIG. 2 is an illustration of an aspiration control device with a sliding interface integrated into a hemostasis valve according to aspects of the present invention;

FIG. 3 is an illustration of an aspiration control device with a push button interface integrated into a hemostasis valve according to aspects of the present invention;

FIG. 5 is an illustration of a system including an aspiration control device integrated into a wire gripping device according to aspects of the present invention;

FIG. 6A through 6C are illustrations of an aspiration control device with a trigger, a locking actuator, and a hemostatic indicator integrated into a hemostasis valve according to aspects of the present invention;

FIGS. 7B through 7I are illustrations of hemostatic indicators according to aspects of the present invention;

FIGS. 8A through 8D are illustrations of an aspiration control device with a trigger finger grip interface integrated into a hemostasis valve according to aspects of the present invention;

FIGS. 9A through 9C are illustrations of an aspiration control device with a two-finger grip interface integrated into a hemostasis valve according to aspects of the present invention;

FIGS. 11A through 11F are illustrations of two variations of an aspiration control device with a thumb trigger interface integrated into a hemostasis valve according to aspects of the present invention;

FIG. 12 is an illustration of an aspiration control device with a side grip interface integrated into a hemostasis valve according to aspects of the present invention;

FIGS. 13A through 13E are illustrations of blood flow indicators for an aspiration control device according to aspects of the present invention;

FIGS. 18 through 21 are flow diagrams each including method steps for controlling aspiration during a thrombectomy according to aspects of the present invention.

DETAILED DESCRIPTION

Figure 4:
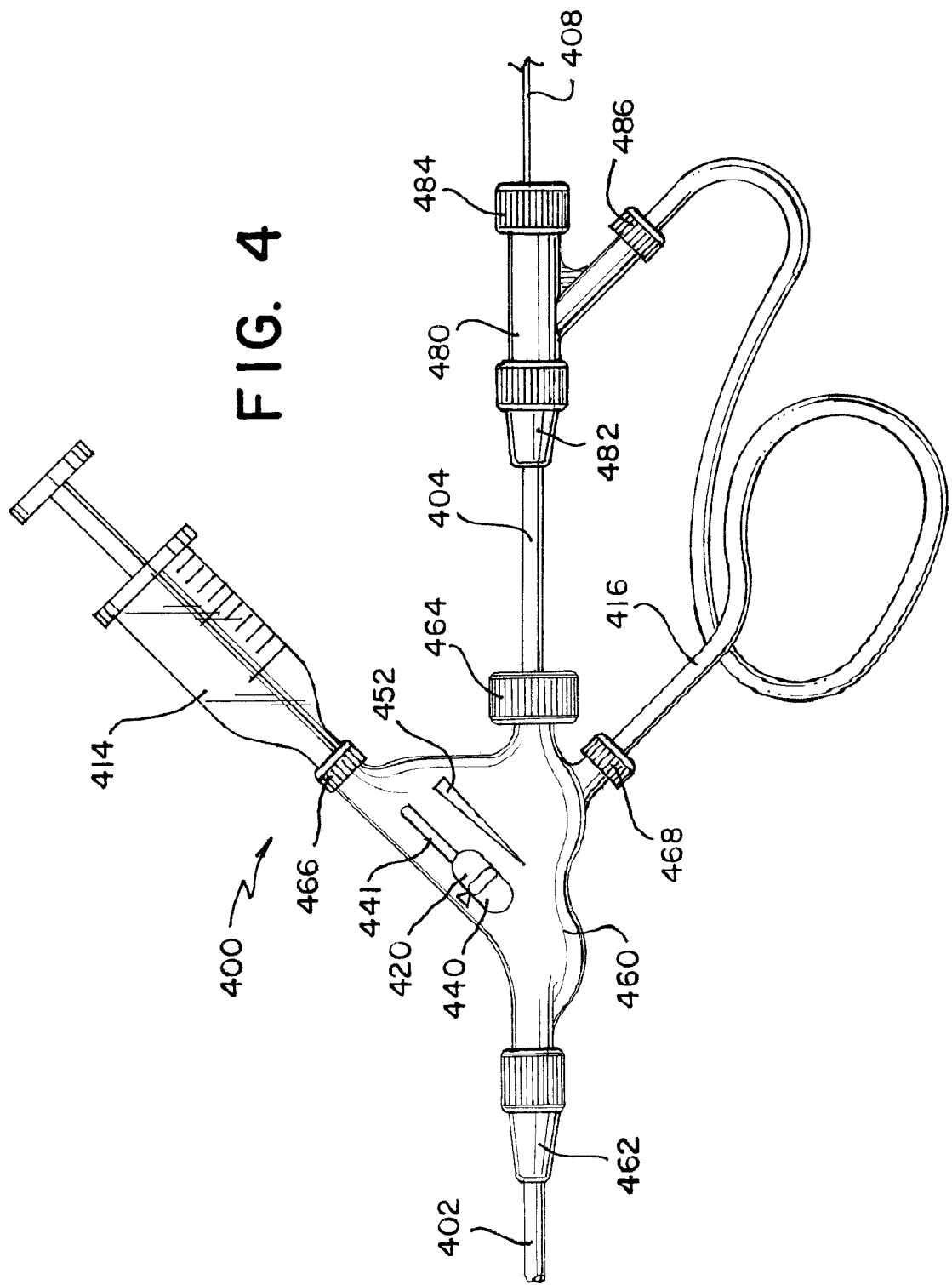
FIG. 4 is an illustration of a system including an aspiration control device connected to regulate aspiration at two hemostasis valves according to aspects of the present invention.

Examples disclosed herein can generally include an aspiration control apparatus or device used together with a hemostasis valve to allow a physician to more easily vary a flow rate of aspirated blood during an intravascular treatment compared to some traditional systems. The aspiration control device can include a control valve in a flow path of aspirated blood and an interface for moving the control valve to regulate a flow rate through the flow path. Controlling the flow rate at the control valve can control reverse blood flow at a treatment site. For example, a flow rate of a reverse blood flow around a blood clot can be varied during a thrombectomy procedure by manipulating the aspiration control device.

The aspiration control device can be positioned at various locations and have various configurations of control interfaces to achieve greater ease of use compared to traditional systems. For example, the aspiration control device can be a stand-alone assembly that is connectable to a side port of a hemostasis valve, the aspiration control device and hemostasis valve can be integrated as a single assembly, or the aspiration control device can be integrated with a secondary device such as a wire grip device. The interface for moving the control valve can move between two or more discrete positions or over a continuum of positions. Likewise, the control valve can be movable between two or more discrete positions or over a continuum of positions in response to positioning the interface. The regulated flow rate through the control valve can be adjusted by the movement of the control valve. For example, the interface can include a mechanical interface such as a slider, push button, switch, wheel, trigger, grip, lever, rotating valve, handle, etc., the interface can be positioned to allow the physician to adjust the flow rate while simultaneously stabilizing a Guide Catheter or sheath with only a single hand, leaving the physician's second hand free for other activities such as withdrawing a stentriever and microcatheter. The interface can be designed to function similar to valves already known to physicians, such as a rotating valve, to provide a more intuitive interface. In some examples, the aspiration control device can additionally include an electrical actuator that can be programmed to provide specific waveforms or aspiration flow patterns.

Some example systems having purely mechanical aspiration control device and some example systems which additionally include an electrical actuator can be used to switch on or off the vacuum to allow the vacuum to build to give sudden and significant pressure changes in the catheter to help get improved engagement and removal of challenging thrombus.

The control valve can have various orientations to regulate blood flow through the control valve. The control valve can include a section of compressible tubing that can be compressed by manipulating the aspiration control device interface. The valve can be in a normally open, non-compressed state when not being manipulated and can compress to restrict flow as a result of manipulation of the interface, the valve can be in a normally closed, compressed state when not being manipulated and can expand to increase flow as a result of manipulation, or the valve can retain its last state of compression, possibly a partially compressed state, when not manipulated and moved to a different retainable state as a result of manipulation. For example, a spring-loaded control valve can be designed as a normally open or normally closed valve, and a rotating valve can be designed as a state retaining valve.

The aspiration control device can be designed to be used together with two hemostasis valves, the first hemostasis valve providing a suction path for the Guide Catheter, and the second hemostasis valve providing a suction path for the Intermediate Catheter. The aspiration control device can simultaneously regulate vacuum through the Guide Catheter and the Intermediate Catheter through connections to both the first and second hemostasis valves. An advantage of this configuration is the ability to provide suction at two hemostasis valves with a single vacuum source (e.g. single pump or syringe). A second aspiration control device can be used together with the two hemostasis valves and the first aspiration control device, and the second aspiration control device can be connected to the single vacuum source through the first aspiration control device. Configured thusly, two catheters can simultaneously receive suction from the single vacuum, with differing vacuum pressures.

Alternatively, or additionally, the aspiration control device can be designed as integrated into a secondary device that can be used in conjunction with a hemostasis valve. For example, the aspiration control device can be integrated into a wire grip device, allowing a physician to use a single hand to control the rate of aspiration while simultaneously retracting a thrombectomy device and/or microcatheter, leaving the physician's second hand free for other activities such as stabilizing a Guide Catheter.

FIG. 1 is an illustration of an example system 100 including an aspiration control device 120 and a hemostasis valve 160. FIG. 1 illustrates the aspiration control device 120 as a stand-alone device that is connectable to a side port 166 of the hemostasis valve 160 and connectable to tubing 112 of a vacuum system. An advantage of the stand-alone aspiration control device 120 is that it can be configured to mate with a traditional hemostasis valve 160. A catheter 102 can be received by an entrance 162 of the hemostasis valve 160, and the aspiration control device 120 can be positioned in a flow path from the catheter 102, through the side port 166 of the hemostasis valve 160, and out through the tubing 112 to the vacuum system. The aspiration control device 120 can have an internal valve that can be adjusted by moving a control interface or actuator 140. The aspiration control device 120 can include a flow rate indicator 152 to provide a visual indicate of a rate of blood flow through the aspiration control device 120. The aspiration control device 120 can be positioned so that a physician can adjust the flow rate through the flow path with the interface 140 while simultaneously stabilizing the Guide Catheter 102 and extracting a pull wire, shaft of a thrombectomy device, or other inner elongated member 108 from an exit 164 of the hemostasis valve 160.

FIG. 2 is an illustration of an example system 200 including an aspiration control device 220 integrated with a hemostasis valve 260. The integrated aspiration control device 220 and hemostasis valve 260 can be integrated into a common housing. The integrated apparatus can have an entrance 262 with a luer connection to receive and hemostatically seal a catheter 202, an exit 264 sized to allow passage of an inner elongated member 208 and adjustable to hemostatically seal the inner elongated member 208, a side port 266 designed to connect with a vacuum system, a control interface 240 for manipulating the control valve to regulate aspirated blood flow, and a visual indicator 252 to provide an indication of the aspirated blood flow rate. The control valve can be positioned in a flow path extending from a lumen of the catheter 202 to the side port 266, and the control valve can regulate the aspirated blood flow rate through the flow path. The control interface 240 can be a slider button that is movable along a track 241, and the control valve can have an opening that is resized as the slider 240 is moved along the track 241, thereby regulating the aspirated blood flow rate. The slider 240 can be spring loaded so that it returns to a default position when not being manipulated. Alternatively, the slider 240 can maintain a position to which it was recently moved when not being manipulated.

FIG. 3 is an illustration of an example system 300 including an aspiration control device 320 integrated with a hemostasis valve 360. The integrated aspiration control device 320 and hemostasis valve 360 can be integrated into a common housing. The integrated apparatus can have an entrance 362 sized to receive and hemostatically seal a catheter 302, an exit 364 sized to allow passage of an inner elongated member 308 and hemostatically seal the inner elongated member 308, a side port 366 designed to connect with a vacuum system, an aspiration control valve in communication with the side port 366, and a control interface 340 for manipulating the control valve to regulate aspirated blood flow. The control valve can be positioned in a flow path extending from a lumen of the catheter 302 to the side port 366, and the control valve can regulate an aspirated blood flow rate through the flow path. The control interface 340 can be a push button that is movable from a fully extended state to a fully compressed state. The push button 340 can be held at an intermediate state between the fully extended state to the fully compressed state. The control valve can have an opening that is sized depending on the state of the push button, and the flow rate through the flow path can be regulated based on the size of the opening. The control valve can be normally open, meaning the opening of the control valve is at a maximum size to allow a maximum flow rate when the push button 340 is fully extended, and the opening of the control valve shrinks to restrict blood flow as the push button 340 is compressed. Alternatively, the control valve can be normally closed, meaning the opening of the control valve is at a minimum size to allow a minimum flow rate when the push button 340 is fully extended, and the opening of the control valve extends to allow more blood flow as the push button 340 is compressed.

FIG. 4 is an illustration of an example system 400 including an aspiration control device 420 connected to regulate aspiration at two hemostasis valves 460, 480. The system 400 can provide suction simultaneously to two catheters 402, 404 from a single vacuum source 414, and the aspiration control device 420 can simultaneously regulate flow rates through both catheters 402, 404.

The system 400 can include a first hemostasis valve 460 that is integrated with the aspiration control device 420. The integrated aspiration control device 420 and hemostasis valve 460 can be integrated into a common housing. The integrated apparatus can have an entrance 462 sized to receive and hemostatically seal a Guide Catheter 402, an exit 464 sized to allow passage of an Intermediate Catheter 404 and hemostatically seal the Intermediate Catheter 404, a first side port 466 designed to connect with a vacuum system, a second side port 468 designed to connect to the second hemostasis valve 480, an aspiration control valve in communication with the first side port 466 and the second side port 468, a control interface 440 for manipulating the control valve to regulate aspirated blood flow, and a visual indicator 452 to provide an indication of an aspirated blood flow rate through the control valve.

The system 400 can include a second hemostasis valve 480 having an entrance 482 positioned to receive the Intermediate Catheter 404 and hemostatically seal the Intermediate Catheter 404, an exit 484 sized to allow passage of an inner elongated member 408 such as a microcatheter and hemostatically seal the inner elongated member 408, and a side port 486. The side port 486 of the second hemostasis valve 480 can be connected by way of a tube 416 to the second side port 468 of the first hemostasis valve 460.

The system 400 can include two flow paths to provide suction to each catheter 402, 404 simultaneously. The two flow paths can converge in the control valve of the aspiration control device 420 and receive vacuum pressure from a syringe 414 or other vacuum source connected at the first side port 466 of the first hemostasis valve 460. A first flow path can extend from a lumen of the Guide Catheter 402 to the first side port 466 of the first hemostasis valve 460. A second flow path can extend from a lumen of the Intermediate Catheter, 404, through a side port 486 of the second hemostasis valve 480, through the tube 416, through the second side port 468 of the first hemostasis valve 460, through the control valve of the aspiration control device 420, and to the first side port 466 of the first hemostasis valve 460. Because the first and second flow paths converge in the control valve, the control valve can regulate a first aspirated blood flow rate through the first flow path and a second aspirated blood flow rate through the second flow path. The visual indicator 452 can indicate a flow rate of aspirated blood through the control valve. The flow rate through the control valve can be the sum of the first flow rate through the first flow path and the second flow rate through the second flow path.

The control interface 440 can be a slider button that is movable along a track 441, and the control valve can have an opening that is resized as the slider 440 is moved along the track 441, thereby regulating the first and the second aspirated blood flow rates. The slider 440 can be spring loaded so that it returns to a default position when not being manipulated. Alternatively, the slider 440 can maintain a position to which it was recently moved when not being manipulated.

FIG. 5 is an illustration of an example system 500 including an aspiration control device 520 integrated into a wire gripping device 590. The system 500 can include two hemostasis valves 560, 580. At least one of the hemostasis valves 560, 580 can be connected to the aspiration control device 520 to receive suction from a vacuum source by way of the aspiration control device. The aspiration control device 520 can be positioned so that a physician can simultaneously manipulate the wire gripping device 590 and the control interface 540 of the aspiration control device 520 with one hand while the physician's second hand is free to perform other tasks, such as stabilize the Guide Catheter 502.

The system 500 can include a first hemostasis valve 560 and a second hemostasis valve 580 each having a hemostatically sealable entrance 562, 582, a hemostatically sealable exit 564, 584, and a side port 566, 586. The hemostasis valves 560, 580 can be a traditional type hemostasis valve as is known in the art, or a hemostasis valve incorporating features described herein. The first hemostasis valve 560 can receive the Guide Catheter 502 at the entrance 562, pass the Intermediate Catheter 504 through the exit 564, and connect to tubing 516 at the side port 566. The second hemostasis valve 580 can receive the microcatheter 504 at the entrance 582, pass a stentriever 508 or other such shaft, guidewire, or inner elongated member through the exit 584, and have a side port 586 connectable to a pressure flush system, for example as per standard thrombectomy procedure.

The integrated wire grip device 590 and aspiration control device 520 can be integrated into a common housing. The integrated apparatus can have an entrance 592 for receiving and gripping the inner elongated member 508, an exit 594 for passing through the inner elongated member 508, a first side port 596, a second side port 598, a control valve, and a control interface 540 for the control valve.

The system 500 can include a first flow path from the Guide Catheter 502, through the side port 566 of the first hemostasis valve 560, through the tubing 516, through the second port 598 of the integrated pull wire/aspiration control apparatus, through the control valve of the aspiration control device 520, and to the first port 596 of the integrated pull wire/aspiration control apparatus. The aspiration control device 520 can control flow through the first flow path to regulate aspirated blood flow through the Guide Catheter 502.

The control interface 540 can be a slider button that is movable along a track 541, and the control valve can have an opening that is resized as the slider 540 is moved along the track 541, thereby regulating the aspirated blood flow rate through the Guide Catheter 502. The slider 540 can be spring loaded so that it returns to a default position when not being manipulated. Alternatively, the slider 540 can maintain a position to which it was recently moved when not being manipulated.

In an example implementation of the system 500 illustrated in FIG. 5, a physician can withdraw the microcatheter 504 and thrombectomy device shaft 508 from the catheter 502 while simultaneously controlling aspiration by manipulating the control interface 540. In the example implementation, the system can be configured as follows: the exit 564 of the first hemostasis valve 560 can be at a semi-open position, allowing the microcatheter 504 to slide through the exit 564 while inhibiting air leakage; the microcatheter 504 can be locked in place at the entrance of the second hemostasis valve 580 so that the microcatheter 504 is inhibited from moving in relation to the second hemostasis valve 580; the exit 584 of the second hemostasis valve 580 can be locked around the stentriever device shaft 508 so that the shaft 508 is inhibited from moving in relation to the second hemostasis valve 580 and the microcatheter 504; and the wire gripping device 590 can be locked to the shaft 508 so that the shaft 508 is inhibited from moving in relation to the gripping device 590. Configured thusly, the wire gripping device 590 can be moved proximally in relation to the first hemostasis valve 560, thereby pulling the stentriever shaft 508, second hemostasis valve 580, and microcatheter 504 proximally and withdrawing the microcatheter 504 and device 508 from the Guide Catheter 502. The physician can use one hand to stabilize the first hemostasis valve 560 while using the other hand to simultaneously pull the wire gripping device 590 and manipulate the control interface 540 on the wire gripping device 590.

Figure 6C:
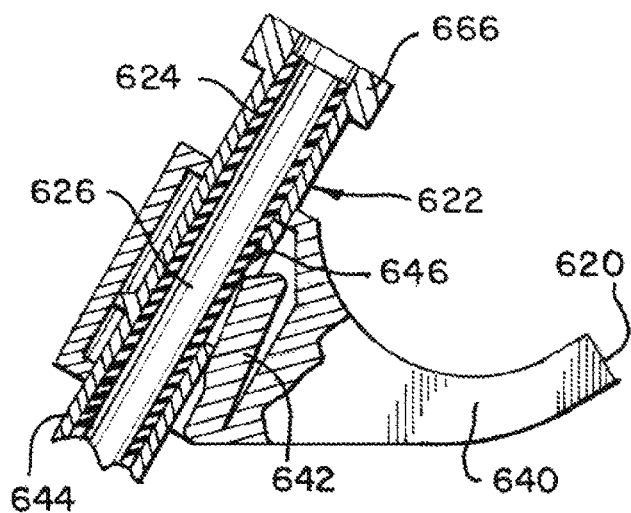

FIG. 6A is an illustration of an example system 600 including an aspiration control device 620 with a trigger control interface 640, integrated into a hemostasis valve 660. FIGS. 6B and 6C are cross-sectional views of the aspiration control device 620 depicted in FIG. 6A with FIG. 6B illustrating the control interface 640 at an initial position and FIG. 6C illustrating the control interface 640 at a retracted position. Referring collectively to FIGS. 6A and 6C, the integrated aspiration control device 620 and hemostasis valve 660 can be integrated into a common housing. The integrated apparatus can have an entrance 662 sized to receive and hemostatically seal a catheter 602, an exit 664 sized to allow passage of an inner elongated member 608 and hemostatically seal the inner elongated member 608, a side port 666 designed to connect with a vacuum system, an aspiration control valve 622 in communication with the side port 666, a trigger control interface 640 for manipulating the control valve 622 to regulate aspirated blood flow, a lock actuator 670 positioned at the exit 664, and a hemostatic indicator 672 for indicating the status of the hemostatic seal at the exit 664.

The control valve 622 can be positioned in a flow path extending from a lumen 603 of the Guide Catheter 602, through a proximal end 663 of the Guide Catheter 602, to the side port 666, and the control valve 622 can regulate the aspirated blood flow rate through the flow path. The control interface 640 can be a trigger that is movable along a portion 644 of the housing extending toward the side port 666. The portion 644 can define a length of travel of the trigger 640 so that the trigger is in an initial, or fully extended position when it is nearest the side port 666, and the trigger is in a final, or fully retracted position when it is nearest the body of the hemostasis valve 660. The trigger 640 can be spring loaded to return to the initial position when the trigger 640 is not being manipulated.

The integrated aspiration control/hemostasis valve apparatus can be gripped with a single hand with a thumb positioned on the body of the apparatus near the exit locking actuator 670, an index finger positioned on the trigger 640, and the remaining fingers positioned on the apparatus and Guide Catheter 602 to stabilize the Guide Catheter 602. The trigger can be moved from the initial position to a retracted position by squeezing the index finger toward the thumb.

Referring to FIGS. 6B and 6C, the aspiration control device 620 can include a control valve 622 including a compressible tubing 624 having an opening 626 that is movable through a range of dimensions in response to being compressed or released by a compression element 642 in communication with the trigger 640. The aspiration control device 620 can be a normally closed device.

FIG. 6B illustrates the control interface 640 at an initial position. In the initial position, the compression element 642 can extend through an opening 646 in the housing 644 to provide maximum compression to the compressible tubing 624. As the trigger 640 is moved from the initial position as indicated by the larger arrow, the compression element 642 can engage an edge of the opening 646 in the housing 644 and bend away from the compressible tubing 624 as indicated by the smaller arrow.

FIG. 6C illustrates the control interface 640 at a retracted position, the compression element 642 bent to move out of the opening 646 in the housing 644 as a result of the trigger being squeezed away from the side port 666. As the compression element 642 bends away from the compressible tubing 624, the opening 626 in the compressible tubing 624 can expand to allow a greater flow rate through the control valve 622.

The compression element 642 can be spring loaded or connected to the trigger 640 with a spring force so that when the trigger 640 is released, the compression element 642 moves as a result of the spring force to expand within the opening 646 of the housing portion 644, thereby moving the trigger 640 toward the initial position (as illustrated in FIG. 6B) and restricting the opening 626 in the compressible tubing 624.

Figure 7A:
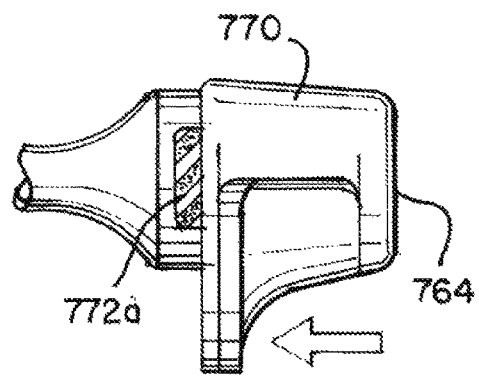
FIG. 7A is an illustration of a locking actuator according to aspects of the present invention.

FIG. 7A is an illustration of an example locking actuator 770 and an example hemostatic indicator 772a that can be positioned at an exit 764 of a hemostasis valve. The locking actuator 770 can be tightened by manipulating a rotating thumb wheel or pressing a push button. The locking actuator 770 can include a gasket or other seal that can be tightened on a catheter, pull wire, or other elongated member extending through the exit 764 of the hemostasis valve. The locking actuator 770 can seal the elongated member against air ingress during aspiration while allowing retraction of the elongated member from the exit 764.

The locking actuator 770 can be displaceable to discrete positions or over a continuum of positions. The locking actuator 770 can be movable from an open, semi-open, and/or closed state of the seal. When the locking actuator 770 is in the semi-open position, an inner elongated member passing through the locking actuator 770 can be retracted or moved through a lumen of a catheter engaged at an entrance of a hemostatic valve while the gasket of the locking actuator 770 provides sufficient sealing to prevent air ingress when vacuum is applied to a side port of the hemostasis valve during aspiration. Air leakage around an inner elongated member can diminish the effectiveness of aspiration and reduce the available volume in a vacuum syringe; however, a gasket seal that is too tight around the inner elongated member can inhibit the inner elongated member from being easily and/or properly manipulated during a treatment. In one example application of an example hemostasis valve, during a thrombectomy procedure a microcatheter and a stentriever can be retracted to retrieve a clot into a Guide Catheter while the Guide Catheter is under full vacuum without air leakage through the gasket of the locking actuator 770.

The locking actuator can be indexed to easily and quickly select the position where it accurately seals against the elongate member to prevent air ingress while still facilitating retraction of the elongate member through the hemostasis valve. In particular, for thrombectomy use the locking actuator can be set to prevent air ingress when the elongate member is a microcatheter with an inner diameter of 0.021" or 0.017".

The hemostatic indicator can be movable to indicate which position the locking actuator is currently in. The indicator 772a can have colored portions that are coded to represent the status of the seal. The indicator 772a can be colored with three portions, a first portion indicating a fully open seal operation, a second portion indicating the seal is operational to provide an air seal and allow retraction of the elongated member, and a third portion indicating a locked closed operation. The indicator 772a can be visible from one or more windows positioned on a side of the housing of the hemostasis valve, and the indicator can be a band with three regions, each region of a different pattern and/or color so that the region visible through the window is changed as the indicator 772a is rotated. Alternatively, the indicator 772a can be visible from two windows positioned on opposite sides of the housing of the hemostasis valve, and the indicator 772a can be a band with six regions with same colored regions positioned opposite each other.

Figure 7B:
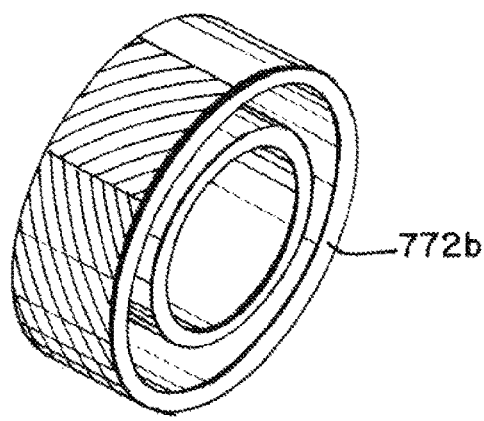
Figure 7C:
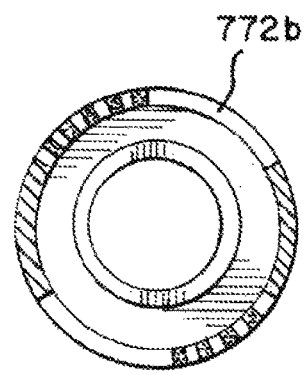
Figure 7D:
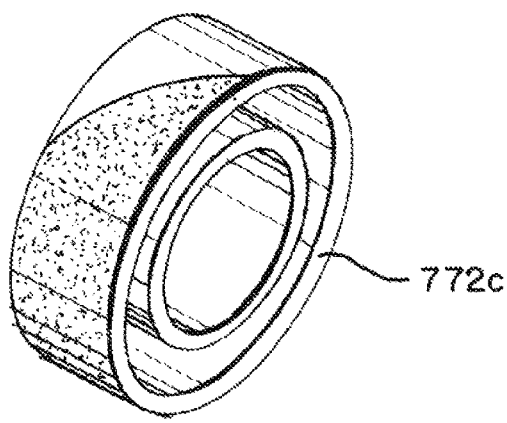
Figure 7E:
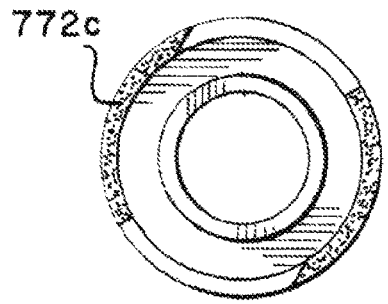

FIGS. 7B through 7I are illustrations of hemostatic indicators 772b, 772c, 772d, 772e that can be used in place of hemostatic indicator 772a with the locking actuator 770 illustrated in FIG. 7A. Hemostatic indicators 772b, 772c, 772d in FIGS. 7B through 7I can each have three distinguishably patterned and/or distinguishably colored portions to indicate the fully open, hemostatic retraction, and locked operational modes described in relation to FIG. 7A, and each indicator 772b, 772c, 772d can be a band with six regions with same patterned and/or colored regions positioned opposite each other on the band. As illustrated in FIGS. 7B and 7C, the hemostatic indicator can have a dark colored portion, a striped portion, and a light-colored portion. As illustrated in FIGS. 7D and 7E, the hemostatic indicator 772c can have a dark colored portion, a diagonally bisected portion having the dark color on one half of the diagonal and a light color on the other half of the diagonal, and a light-colored portion. As illustrated in FIGS. 7F and 7G, the hemostatic indicator 772d can have three solid colored portions, each portion having a different solid color. As illustrated in FIGS. 7H and 7I, the hemostatic indicator 772e can have three regions, each region having a distinguishable solid color.

FIGS. 8A through 8D are illustrations of an example system 800 including an aspiration control device 820 with a trigger control interface 840, integrated with a hemostasis valve 860. FIGS. 8A and 8B illustrate the aspiration control device in an initial position, where FIG. 8B is a cross-sectional view of components of the aspiration control device 820. FIGS. 8C and 8D illustrate the aspiration control device in a retracted position, where FIG. 8D is a cross-sectional view of components of the aspiration control device 820.

Referring collectively to FIGS. 8A through 8D, the integrated aspiration control device 820 and hemostasis valve 860 can be integrated into a common housing. The integrated apparatus can have an entrance 862 sized to receive and hemostatically seal a catheter 802, an exit 864 sized to allow passage of an inner elongated member 808 and hemostatically seal the inner elongated member 808, a side port 866 designed to connect with a vacuum system, an aspiration control valve 822 in communication with the side port 866, a trigger control interface 840 for manipulating the control valve 822 to regulate aspirated blood flow, a lock actuator 870 positioned at the exit 864 and including a hemostatic seal, and a hemostatic indicator 872 for indicating the status of the hemostatic seal at the exit 864.

The control valve 822 can be positioned in a flow path extending from a lumen 803 of the Guide Catheter 802 to the side port 866, and the control valve 822 can regulate the aspirated blood flow rate through the flow path. The trigger control interface 840 can extend between a joint 850 positioned near the exit locking actuator 870 to a grooved sleeve 854 positioned around a portion 844 of the housing extending toward the side port 866. The trigger 840 can bend at the joint 850, and the grooved sleeve 854 can slide along the portion 844 of the housing. The housing portion 844 can define a length of travel of the trigger 840 so that the trigger is in an initial, or fully extended position when it is bent toward the side port 866 as illustrated in FIGS. 8A and 8B, and the trigger is in a final, or fully retracted position when it is bent toward the body of the hemostasis valve 860 as illustrated in FIGS. 8C and 8D. The trigger 840 can be spring loaded to return to the initial position as illustrated in FIGS. 8A and 8B when the trigger 840 is not being manipulated.

The integrated aspiration control device/hemostasis valve apparatus can be gripped with a single hand with a thumb positioned on a thumb grip 848 near the exit locking actuator 870, an index finger positioned on the trigger 840, and the remaining fingers positioned on the apparatus and Guide Catheter 802 to stabilize the Guide Catheter 802. The trigger 840 can be moved from the initial position to the final position by squeezing the index finger toward the thumb.

Referring to FIGS. 8B and 8D, the aspiration control device 820 can include a control valve 822 including a compressible tubing 824 having an opening 826 that is movable through a range of dimensions in response to being compressed or released by a compression element 842 in communication with the trigger 840. The aspiration control device 820 can be a normally closed device. In the initial position as illustrated in FIG. 8B, the compression element 842 can extend through an opening 846 in the housing 844 to provide maximum compression to the compressible tubing 824. As the trigger 840 is moved from the initial position as indicated by the arrow, a grooved sleeve 854 can move over the housing portion 844. As the grooved sleeve 854 is moved away from the side port 866, the compression element 842 can move into a groove 855 in the grooved sleeve 854 as illustrated in FIG. 8D. The compression element 842 can be spring loaded, or the compression element 842 can slide freely through the opening 846 in the housing 844, being moved into the groove 855 as a result of elastic recovery expanding the compressible tubing 824 and pressing against the compression element 842. As the compression element 842 moves into the groove 855 the compression tubing 824 can expand to allow a greater flow rate through the control valve 822.

The groove 855 can be angled so that as the grooved sleeve 854 is moved along the portion 844 of the housing, being moved away from the side port 866, progressing from the initial position as illustrated in FIG. 8B to the retracted position as illustrated in FIG. 8D, the compression element 842 can move progressively further into the grooved sleeve 854, allowing the opening 826 in the compressible tubing 824 to increase. Aspirated blood flow rate can be controlled by the size of the opening 826 in the compressible tubing 824. Therefore, a blood flow rate can be selected by a user over a continuum of blood flow rates by holding the trigger 840 at a position between the initial position and the fully retracted position. The trigger 840 can be spring loaded so that it returns to the initial position when not being manipulated.

FIGS. 9A through 9C are illustrations of an example system 900 including an aspiration control device 920 with a two-finger grip interface 940 integrated with a hemostasis valve 960. FIGS. 9B and 9C are cross-sectional views of components of the aspiration control device 920 depicted in FIG. 9A, where the aspiration control device 920 is illustrated in an initial position in FIGS. 9A and 9B and the aspiration control device 920 is illustrated in a retracted position in FIG. 9C.

Referring collectively to FIGS. 9A through 9C, the aspiration control device 920 and hemostasis valve 960 can be integrated into a common housing. The integrated apparatus can have an entrance 962 sized to receive and hemostatically seal a catheter 902, an exit 964 sized to allow passage of an inner elongated member 908 and hemostatically seal the inner elongated member 908, a side port 966 designed to connect with a vacuum system, an aspiration control valve 922 in communication with the side port 966, a two-finger grip interface 940 for manipulating the control valve 922 to regulate aspirated blood flow, a lock actuator 970 positioned at the exit 964 and having a hemostatic seal, and a hemostatic indicator 972 for indicating the status of the hemostatic seal at the exit 964.

The control valve 922 can be positioned in a flow path extending from a lumen 903 of the Guide Catheter 902 to the side port 966, and the control valve 922 can regulate the aspirated blood flow rate through the flow path. The control interface 940 can have a grooved sleeve 954 surrounding a portion 944 of the housing of the integrated apparatus near the side port 966. The grooved sleeve 954 can slide along the portion 944 of the housing. The housing portion 944 can define a length of travel of the trigger 940 so that the trigger is in an initial, or fully extended position when it is positioned nearest the side port 966, and the trigger 940 is in a final, or fully retracted position when it is nearest the body of the hemostasis valve 960. The trigger 940 can be spring loaded to return to the initial position when the trigger 940 is not being manipulated. The trigger 940 can have two arms extending from either side of the grooved sleeve 954.

The integrated aspiration control/hemostasis valve apparatus can be gripped with a single hand with a thumb positioned on a thumb grip 948 near the exit locking actuator 970, an index finger positioned on one arm of the two-finger trigger 940, a middle finger positioned on another arm of the two-finger trigger 940, and the remaining fingers positioned on the apparatus and Guide Catheter 902 to stabilize the Guide Catheter 902. The trigger 940 can be moved from the initial position to the final position by squeezing the index finger and middle finger toward the thumb.

Referring to FIGS. 9B and 9C, the aspiration control device 920 can include a control valve 922 including a compressible tubing 924 having an opening 926 that is movable through a range of dimensions in response to being compressed or released by a compression element 942. The compression element 942 can be in communication with the trigger 940 by way of the grooved sleeve 954. The aspiration control device 920 can be a normally closed device. In the initial position as illustrated in FIG. 9B, the compression element 942 can extend through an opening 946 in the housing 944 to provide maximum compression to the compressible tubing 924. As the trigger 940 is moved from the initial position as indicated by the arrows in FIG. 9C, the grooved sleeve 954 can move over the portion of the housing 944 and away from the side port 966. As the grooved sleeve 954 is moved away from the side port 966, the compression element 942 can move into a groove 955 in the grooved sleeve 954.

The compression element 942 can be spring loaded, or the compression element 942 can slide freely through the opening 946 in the housing 944, being moved into the groove 955 as a result of elastic recovery expanding the compressible tubing 924 and pressing against the compression element 942. As the compression element 942 moves into the groove 955 the compression tubing 924 can expand to allow a greater flow rate through the control valve 922. The groove 955 can be angled so that as the grooved sleeve 954 is moved along the portion 944 of the housing and away from the side port 966 as indicated by the arrow, the compression element 942 can move progressively further into the grooved sleeve 954, allowing the opening 926 in the compressible tubing 924 to increase. Aspirated blood flow rate can be controlled by the size of the opening 926 in the compressible tubing 924. Therefore, a blood flow rate can be selected by a user over a continuum of blood flow rates by holding the trigger 940 at a position between the initial position and the fully retracted position. The trigger 940 can be spring loaded so that it returns to the initial position when not being manipulated.

Figure 10A:
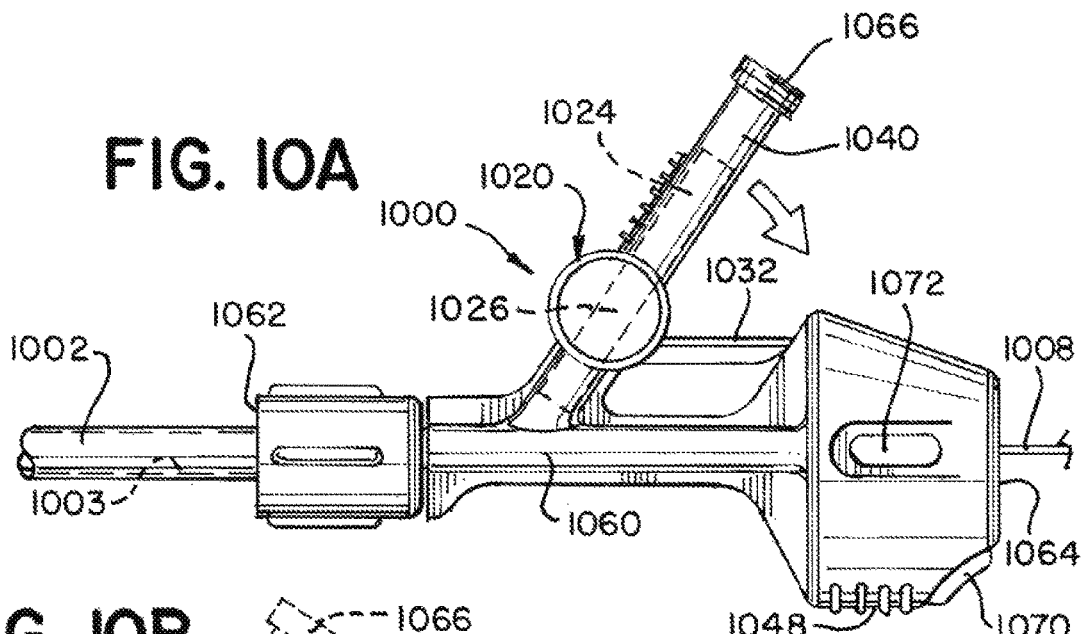
FIGS. 10A through 10C are illustrations of an aspiration control device with a lever interface integrated into a hemostasis valve according to aspects of the present invention.
Figure 10B:
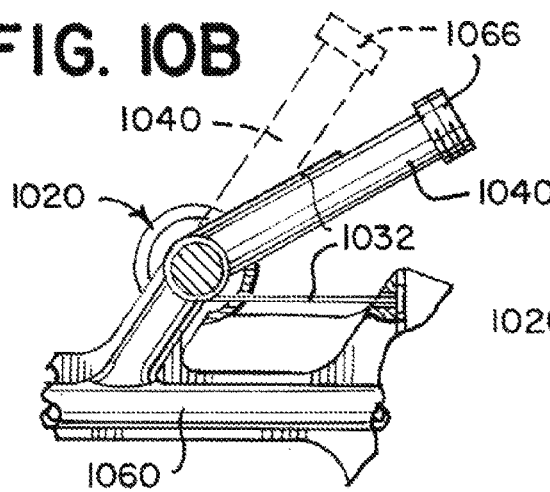
Figure 10C:
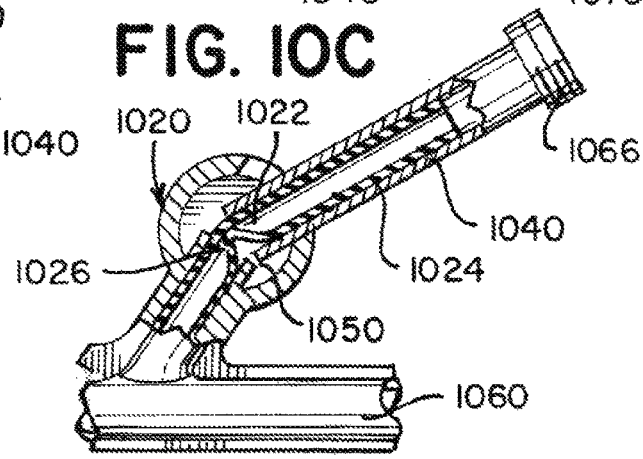

FIGS. 10A through 10C are illustrations of an example system 1000 including an aspiration control device 1020 with a lever interface 1040 integrated into a hemostasis valve 1060, FIG. 10A illustrating the lever interface 1040 in an initial position, FIG. 10B illustrating the lever interface 1040 in a retracted position, and FIG. 10C illustrating a cut-away view of FIG. 10B. Referring collectively to FIGS. 10A through 10C, the aspiration control device 1020 and hemostasis valve 1060 can be integrated into a common housing. The integrated apparatus can have an entrance 1062 sized to receive and hemostatically seal a catheter 1002, an exit 1064 sized to allow passage of an inner elongated member 1008 and hemostatically seal the inner elongated member 1008, a side port 1066 designed to connect with a vacuum system, an aspiration control valve 1022 in communication with the side port 1066, a rotating lever interface 1040 for manipulating the control valve 1022 to regulate aspirated blood flow, a lock actuator 1070 positioned at the exit 1064 and having a hemostatic seal, and a hemostatic indicator 1072 for indicating the status of the hemostatic seal at the exit 1064.

The control valve 1022 can include flexible tubing 1024 positioned to extend through a bending joint 1050 in the housing of the integrated apparatus. The bending joint 1050 can be positioned between the body of the hemostasis valve 1060 and the side port 1066. The housing can be bent at the joint 1050 causing the flexible tubing 1024 to bend. As the flexible tubing 1024 bends, an opening 1026 in the tubing 1024 can resize.

The control valve 1022 can be positioned in a flow path extending from a lumen 1003 of the Guide Catheter 1002 to the side port 1066, and the control valve 1022 can regulate the aspirated blood flow rate through the flow path. The lever 1040 portion of the aspiration control device 1020 can be bent at the joint 1050 from an initial, or fully extended position as illustrated in FIG. 10A to a fully retracted position as indicated in FIG. 10B. The aspiration control device 1020 can include a spring 1032 positioned to return the lever 1040 to the initial position when the trigger 1040 is not being manipulated.

The integrated aspiration control device/hemostasis valve apparatus can be gripped with a single hand with a thumb positioned on a thumb grip 1048 near the exit locking actuator 1070, an index finger positioned on the lever 1040, and the remaining fingers positioned on the apparatus and Guide Catheter 1002 to stabilize the Guide Catheter 1002.

The lever 1040 can be moved from the initial position to the final position by squeezing the index finger toward the thumb.

Referring to FIGS. 10A and 10C, the flexible tubing 1024 can have an opening 1026 that is movable through a range of dimensions in response to the flexible tubing 1024 being bent when the lever 1040 is moved. The aspiration control device 1020 can be a normally open device. In the initial position, the flexible tubing 1024 can be substantially straight as illustrated in FIG. 10A. The opening 1026 can be in its largest dimension, widest opening, when the flexible tubing is 1024 substantially strait and the lever is in the initial position 1040. Configured thusly, in the initial position, the aspiration control device 1020 can allow maximum blood flow. As the lever 1040 is moved from the initial position in the direction indicated by the arrows in FIG. 10A, the bending of the flexible tubing 1024 can cause the opening 1026 to contract as illustrated in FIG. 10C, thereby restricting blood flow. Therefore, a blood flow rate can be selected by a user over a continuum of blood flow rates by holding the lever 1040 at a position between the initial position and a fully retracted position. As the lever 1040 is released, the lever 1040 can return to the initial position by the spring 1032.

Figure 11A:
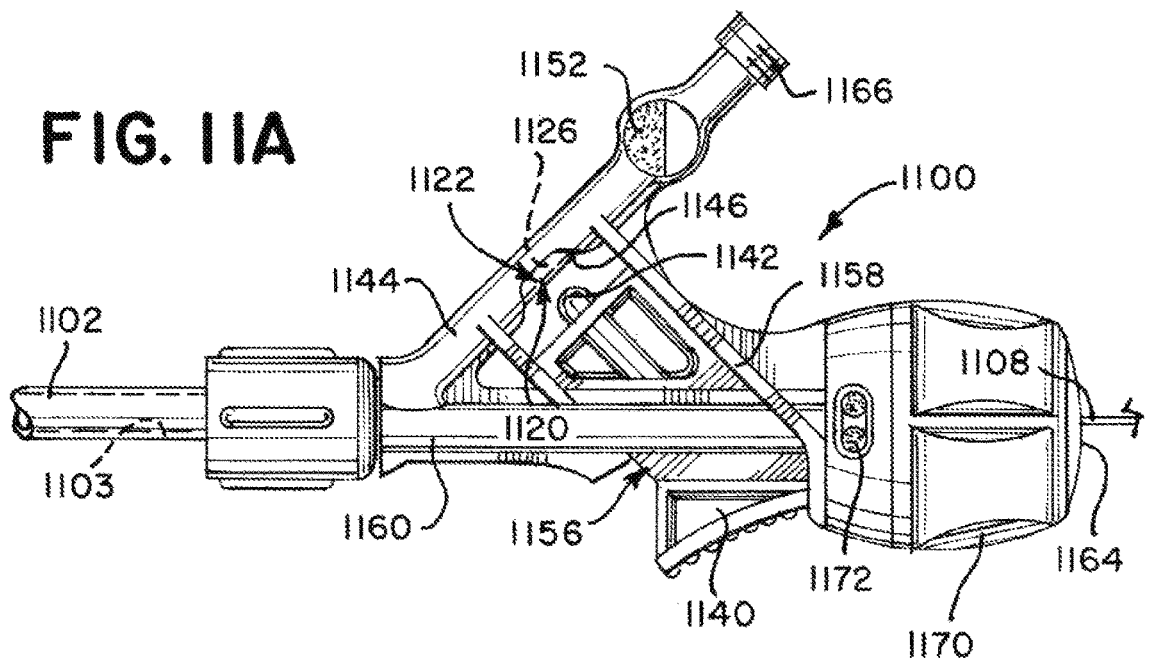

FIGS. 11A through 11F are illustrations of example systems 1100, 1100a including an aspiration control device 1120 with a thumb trigger 1140 integrated into a hemostasis valve 1160. FIGS. 11A and 11B illustrate a system having a thumb trigger 1140 that slides freely while FIGS. 11C through 11F illustrate a system having a thumb trigger 1140a that can be ratcheted to one or more predetermined position and held in place until the ratchet is released. FIGS. 11A, 11C, and 11D illustrate the thumb trigger 1140, 1140a of each respective example system 1100, 1100a in an initial position, and FIGS. 11B, 11E, and 11F illustrate the thumb trigger 1140, 1140a of each respective example system 1100, 1100a in a compressed position. FIG. 11D is a cut-away view illustrating the compression element 1142 and control valve 1122 positioned as in FIG. 11C. FIG. 11F is a cut-away view illustrating the compression element 1142 and control valve 1122 positioned as in FIG. 11E. Referring collectively to FIGS. 11A through 11F, each respective integrated aspiration control device 1120, 1120a and hemostasis valve 1160 can be integrated into a common housing. Each integrated apparatus can have an entrance 1162 sized to receive and hemostatically seal a catheter 1102, an exit 1164 sized to allow passage of an inner elongated member 1108 and hemostatically seal the inner elongated member 1108, a side port 1166 designed to connect with a vacuum system, an aspiration control valve 1122 in communication with the side port 1166, a thumb trigger interface 1140, 1140a for manipulating the control valve 1122 to regulate aspirated blood flow, and a lock actuator 1170 positioned at the exit 1164.

In addition to the features common to the example systems 1100, 1100a, the example system 1100 illustrated in FIGS. 11A and 11B also includes an aspirated blood flow rate indicator 1152 for indicating blood flow rate through the control valve 1122 and a hemostatic indicator 1172 for indicating the status of the hemostatic seal at the exit 1164, and the example system 1100a illustrated in FIGS. 11C and 11F includes a ratchet release lever 1143 and a ratchet interface 1153 that can be used to hold the thumb trigger 1140 in a retracted position and a second side port 1168.

Referring to the example system 1100 illustrated in FIGS. 11A and 11B, the thumb trigger 1140 can move from an initial position as illustrated in FIG. 11A to a compressed configuration as illustrated in FIG. 11B. The thumb trigger 1140 can be spring loaded to return to the initial position when the trigger 1140 is not being manipulated. Referring to the example system 1100a illustrated in FIGS. 11C and 11D, the thumb trigger 1140a can move from an initial position as illustrated in FIG. 11C to a compressed configuration as illustrated in FIG. 11D. The thumb trigger 1140a can be spring loaded by spring 1132. The thumb trigger 1140a can be ratcheted so that it holds at a fully or partially retracted position. The user can press against the thumb trigger 1140a to further retract the thumb trigger 1140a as illustrated by the arrow in FIG. 11D, and the user can return the thumb trigger 1140a to the initial position by pressing a ratchet release lever 1143 as illustrated by the arrow in FIG. 11C, thereby releasing the ratchet interface 1153 and allowing the spring 1132 to return the thumb trigger 1140a.

In either example system 1100, 1100a, the integrated aspiration control/hemostasis valve apparatus can be gripped with a single hand with a thumb positioned on the thumb trigger 1140, 1140a and the fingers positioned on the housing of the integrated apparatus and the Guide Catheter 1102 to stabilize the apparatus and the Guide Catheter 1102 and provide leverage for compressing the thumb trigger 1140, 1140a. The index finger can be positioned near the side port 1166 and the pinky finger can be positioned on the Guide Catheter 1102. The thumb trigger 1140, 1140a can be moved from the initial position illustrated in FIG. 11A or 11C to the compressed position illustrated in FIG. 11B or 11D by squeezing the thumb toward the fingers as indicated by the arrow in FIG. 11B or 11D.

Referring collectively to FIGS. 11A through 11F, in either system 1100, 1100a, the control valve 1122 can be positioned in a flow path extending from a lumen 1103 of the Guide Catheter 1102 to the side port 1166, and the control valve 1022 can regulate the aspirated blood flow rate through the flow path. The control valve 1122 can include compressible tubing 1124 positioned to extend through a portion 1144 of the housing of the apparatus extending between from near the entrance 1162 of the hemostasis valve 1160 to near the side port 1166. The portion of the housing 1144 can have an opening 1146 through which a compression element 1142 can pass to compress the compressible tubing 1124. The compression element 1142 can be connected to the thumb trigger 1140, 1140a so that when the thumb trigger is compressed, the compression element 1142 moves into the opening 1146, presses against the compressible tubing 1124, and compresses the compressible tubing 1124. As the compressible tubing 1124 is compressed, an opening 1126 in the tubing 1124 can be restricted to reduce blood flow rate through the control valve 1122. The opening 1126 can be moved through a range of dimensions in response to being compressed or released by the compression element 1142.

Referring collectively to FIGS. 11A through 11F, in either system 1100, 1100a, the aspiration control device 1120 can be a normally open device. In the initial position, the compression element 1142 can be positioned outside of the opening 1146 in the housing portion 1144, and the compressible tubing 1124 can be uncompressed. In the initial position, the opening 1126 in the compressible tubing 1124 can have a maximum dimension with a wide opening sized to allow a maximum blood flow rate. As the thumb trigger 1140 is moved from the initial position illustrated in FIG. 11A or FIG. 11C in the direction of the arrow as indicated in FIG. 11B or 11D, the compression element 1142 can pass through the opening 1146 in the portion 1144 of the housing holding the compressible tubing 1124 and engage the compressible tubing 1124. As the compression element 1142 presses against the compressible tubing 1124, the opening 1126 in the compressible tubing 1124 can collapse to restrict blood flow through the control valve 1122. As the compression element releases the compressible tubing 1124, or moves toward the initial position, the opening 1126 in the compressible tubing 1124 can expand as a result of elastic recovery within the tubing pressing the tubing open and/or elastic qualities of materials of the compressible tubing 1124.

Referring to the system 1100 illustrated in FIGS. 11A and 11B, the thumb trigger 1140 and the compression element 1142 can be integrated into a singularly molded component 1156, and the component 1156 can be attached to the common housing of the integrated aspiration control device and hemostasis valve. The compression element 1142 can be fixed in relation to the thumb trigger 1140, meaning the compression element 1142 is translated through the same distance as the thumb trigger 1140 when a physician engages the thumb trigger 1140. The component 1156 can pass through a second portion 1158 of the housing. The second portion 1158 can be sized to stabilize the component 1156 in relation to the overall apparatus.

Referring to the system 1100a illustrated in FIGS. 11C through 11F, the thumb trigger 1140a, ratchet release lever 1143, notches to form part of the ratchet interface 1153, and the compression element 1142 can be integrated into a singularly molded component 1156a, and the component 1156a can be attached to the common housing of the integrated aspiration control device and hemostasis valve. Similar to as in FIGS. 11A and 11B, the compression element 1142 of system 1100a can be fixed in relation to the thumb trigger 1140a, meaning the compression element 1142 is translated through the same distance as the thumb trigger 1140a. The component 1156a can surround a second portion 1158a of the housing. The second portion 1158a can be sized to stabilize the component 1156a in relation to the overall apparatus.

Although the systems 1100 and 1100a have similar design in many respects, the usage of each design can be significantly different. For the system 1100 illustrated in FIGS. 11A and 11B, a user can control the position of the thumb trigger 1140 and thereby the flow rate through the aspiration control device 1120 by squeezing and holding the thumb trigger. To select a flow rate with the system 1100 illustrated in FIGS. 11A and 11B the user must apply a force to the thumb trigger 1140a (with the exception of the maximum flow rate when the valve opening 1126 is fully open). For the system 1100a illustrated in FIGS. 11C through 11F, a user can control the flow rate either by pressing the thumb trigger 1140a or by pressing the ratchet release lever 1143. Once the user has selected a flow rate with the system 1100a illustrated in FIGS. 11C through 11F the user can release the trigger 1140a and lever 1143 until the user desires to adjust the flow rate. The position of the trigger 1140a can be maintained by the ratchet interface 1153 and the user need not apply any force to maintain the position of the trigger 1140a.

FIG. 12 is an illustration of an example system 1200 including an aspiration control device 1220 with a side grip interface 1240 integrated into a hemostasis valve 1260. The side grip interface 1240 can include a button compressible to vary a flow rate of aspirated blood through the aspiration control device 1220. A catheter 1202 can be received by an entrance 1262 of the hemostasis valve 1260, and the aspiration control device 1220 can be positioned in a flow path from the catheter 1202 to the side port 1266 of the hemostasis valve 1260. The side port 1266 can be sized to be connected to a vacuum system such as a vacuum pump or syringe. The aspiration control device 1220 can have an internal valve having an opening that can be adjusted by pressing the side grip 1240. The aspiration control device 1220 can be positioned so that a physician can adjust the flow rate through the flow path with the side grip 1240 while simultaneously stabilizing the Guide Catheter 1202 and extracting a pull wire or other inner elongated member from an exit 1264 of the hemostasis valve 1260. The aspiration control device 1220 can further include a hemostatic indicator 1272 and an exit locking actuator 1270.

The side grip 1240 can be compressed as a binary switch that switches between a maximum and a minimum blood flow rate. Alternatively, the side grip 1240 can be clicked through a sequence of flow rates, each click selecting a progressively greater or lesser flow rate ending with a reset click returning the flow rate to a starting flow rate. Alternatively, the side grip 1240 can adjust the flow rate over a continuum of flow rates in response to a force applied to the side grip, where the flow rate can be directly or inversely related to the force. In any of the configurations, the aspiration control device 1220 can be a normally open or normally closed device.

FIGS. 13A through 13E are illustrations of blood flow indicators that can be used to indicate blood flow through an aspiration control device. The blood flow indicators illustrated in FIGS. 13A through 13E can be placed in a flow path that includes a control valve of the aspiration control device. Some specific example aspiration control devices 120, 420, 1120 disclosed herein include a blood flow indicator 152, 452, 1152 (see FIGS. 1, 4, 11A, and 11B), and these blood flow indicators 152, 452, 1152 can be designed as illustrated in FIGS. 13A through 13E or other design having a similar function. It is contemplated that other examples disclosed herein can also include a blood flow indicator such as illustrated in FIGS. 13A through 13E or other design having a similar function.

It is contemplated that visual indication of blood flow can be achieved by providing transparent materials along the blood flow path so that blood in the path can be seen by a physician or user. FIG. 13A illustrates a pin wheel flow rate indicator that can be positioned within the flow path and housed by transparent materials. In addition to the physician seeing the presence of blood in the flow path, the pin wheel can be visible through transparent materials along the blood flow path. The pin wheel can spin faster as blood flow rate is increased, and the physician can be provided a visual indication of blood flow rate by the spin speed of the pin wheel. Alternatively, the blood need not be visible so long as at least a portion of the pin wheel is visible, and the portion moves as a visual indication of blood flow rate.

Figure 13C:
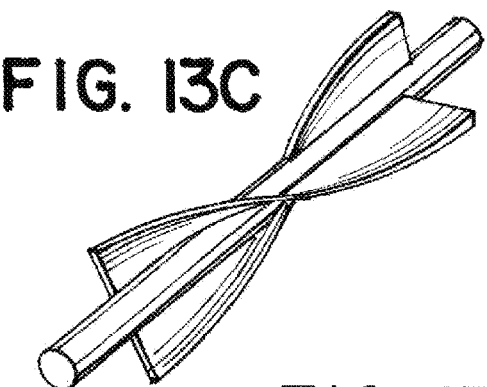

FIGS. 13B and 13C illustrate a rotating flanged barrel flow rate indicator that can be positioned within the flow path and housed by transparent materials. The tips of flanges of the flow rate indicator can be visible through transparent materials along the blood flow path. The barrel can rotate faster as blood flow rate is increased, and a physician can be provided a visual indication of blood flow rate by the speed of the flange tips. Alternatively, the blood need not be visible so long as at least a portion of the flow rate indicator is visible that moves as a visual indication of blood flow rate.

Figure 13D:
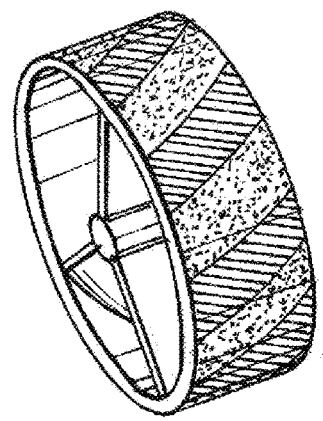
Figure 13E:
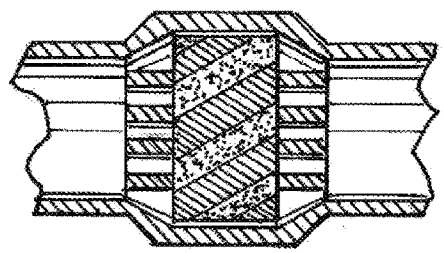

FIGS. 13D and 13E illustrate a rotating striped band having angled blades extending from an interior circumference of the band to a central node. The blades can be positioned along the blood flow path, and as blood flows over the angled blades, the indicator can rotate circumferentially with a spin speed that is determined by the blood flow rate. The striped perimeter of the band can be visible by the physician, and the spin speed of the band can provide a visual indication of flow rate. The band can be made visible by being positioned within a transparent housing or by being positioned to be visible through an opening of a non-transparent housing.

Figure 14A:
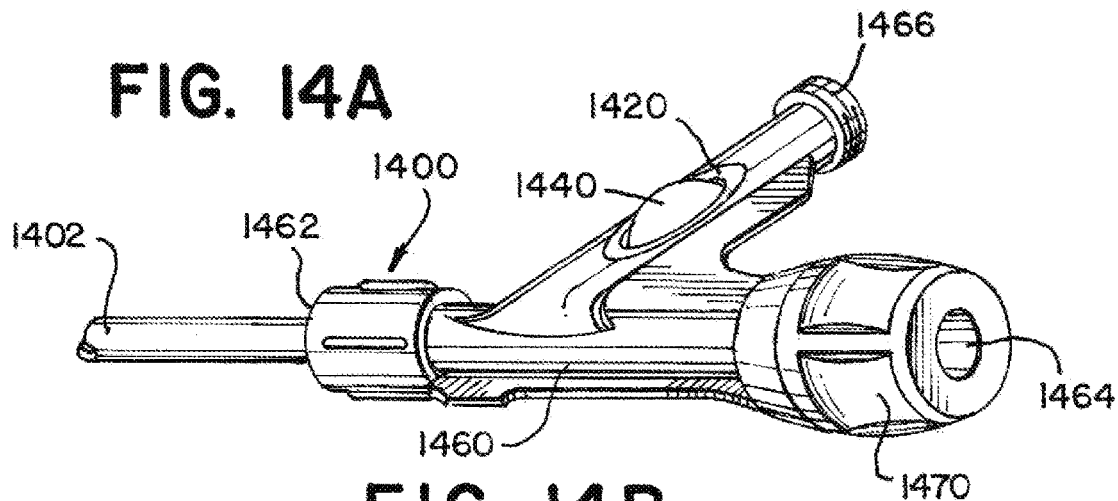
FIGS. 14A through 14D are illustrations of an aspiration control device controlled by a push button interface integrated into a hemostasis valve according to aspects of the present invention.
Figure 14B:
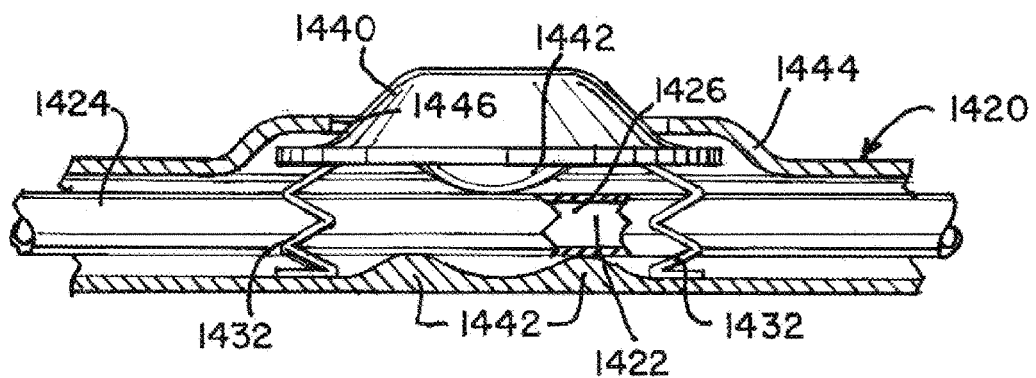
Figure 14C:
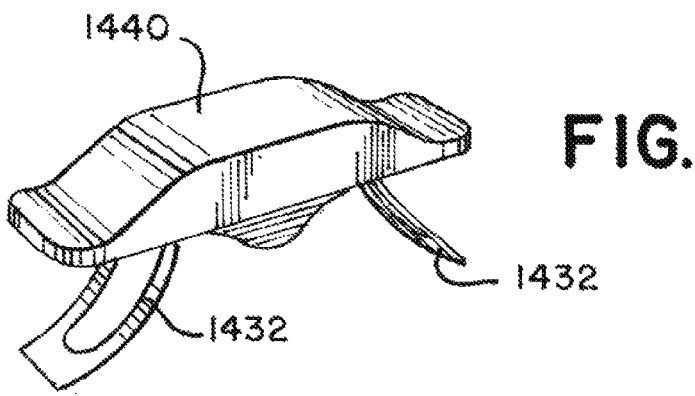
Figure 14D:
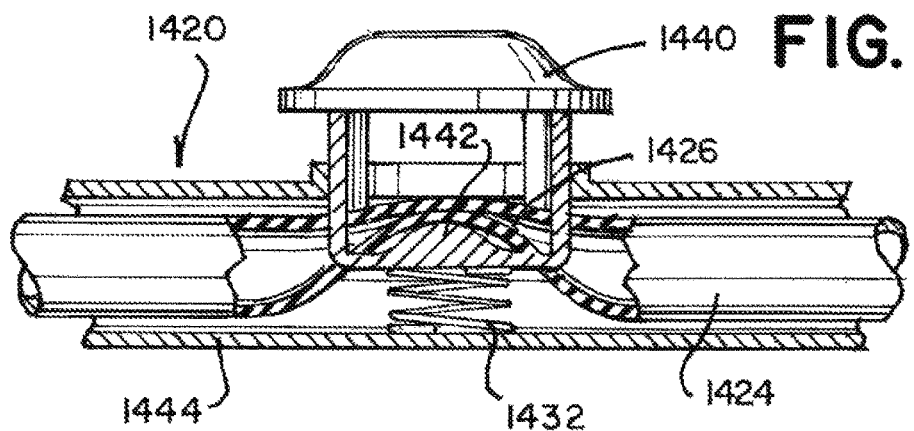

FIG. 14A is an illustration of an example system 1400 including an aspiration control device 1420 controlled by a push button interface 1440, the aspiration control device 1420 integrated with a hemostasis valve 1460 in a common housing. FIGS. 14B through 14D are illustrations of various aspects and configurations of the aspiration control device 1420.

The push button interface 1440 can include a button compressible to vary a flow rate of aspirated blood through the aspiration control device 1420. A catheter 1402 can be received by an entrance 1462 of the hemostasis valve 1460, and the aspiration control device 1420 can be positioned in a flow path from the catheter 1402 to the side port 1466 of the hemostasis valve 1460. The side port 1466 can be sized to be connected to a vacuum system such as a vacuum pump or syringe. The aspiration control device 1420 can have an internal valve that can be adjusted by pressing the push button interface 1440. The push button interface 1440 can be positioned so that a physician can adjust the flow rate through the flow path with the push button 1440 while simultaneously stabilizing the Guide Catheter 1402 and extracting a pull wire or other inner elongated member from an exit 1464 of the hemostasis valve 1460. The aspiration control device 1420 can further include an exit locking actuator 1470.

As illustrated in FIG. 14B, the aspiration control device 1420 can include a compressible tubing 1424, a housing 1444, the button 1440, and springs 1432. The compressible tubing 1424 can act as a valve 1422 with an opening 1426 that can be resized through a continuum of dimensions in response to a force applied to press the button 1440. The housing 1444 can contain the compressible tubing 1424. The button 1440 can be mounted in an opening 1446 of the housing 1444 and be attached to the housing 1444 by one or more springs 1432. The aspiration control device 1420 can be a normally open device, and FIG. 14B can illustrate the aspiration control device 1420 in an initial, open position. In the initial position, the compressible tubing 1424 can have an opening 1426 that is open to allow maximum blood flow. The button 1440 can be pressed to compress the compressible tubing 1424. The aspiration control device 1420 can include compression elements 1442 positioned to press against the compressible tubing 1424 to resize the opening 1426 when the button 1440 is pressed. The springs 1432 can provide a spring force to return the aspiration control device 1420 to the initial position when the button 1440 is not being manipulated. For the normally open configuration, the flow rate can be inversely related to the force applied to the button.

FIG. 14C illustrates a variation on the configuration of the springs 1432 of the aspiration control device 1420 as described in relation to FIG. 14B.

As illustrated in FIG. 14D, the aspiration control device 1420 can be a normally closed device. The one or more springs 1432 can be positioned to provide a spring force to compress the compressible tubing 1424 when the push button 1440 is not being manipulated. A force applied to the button 1440 can move the compression elements 1442 to allow the opening 1426 in the compressible tubing 1424 to expand to increase blood flow rate. For the normally closed configuration, the flow rate can be directly related to the force applied to the button 1440.

Figure 15:
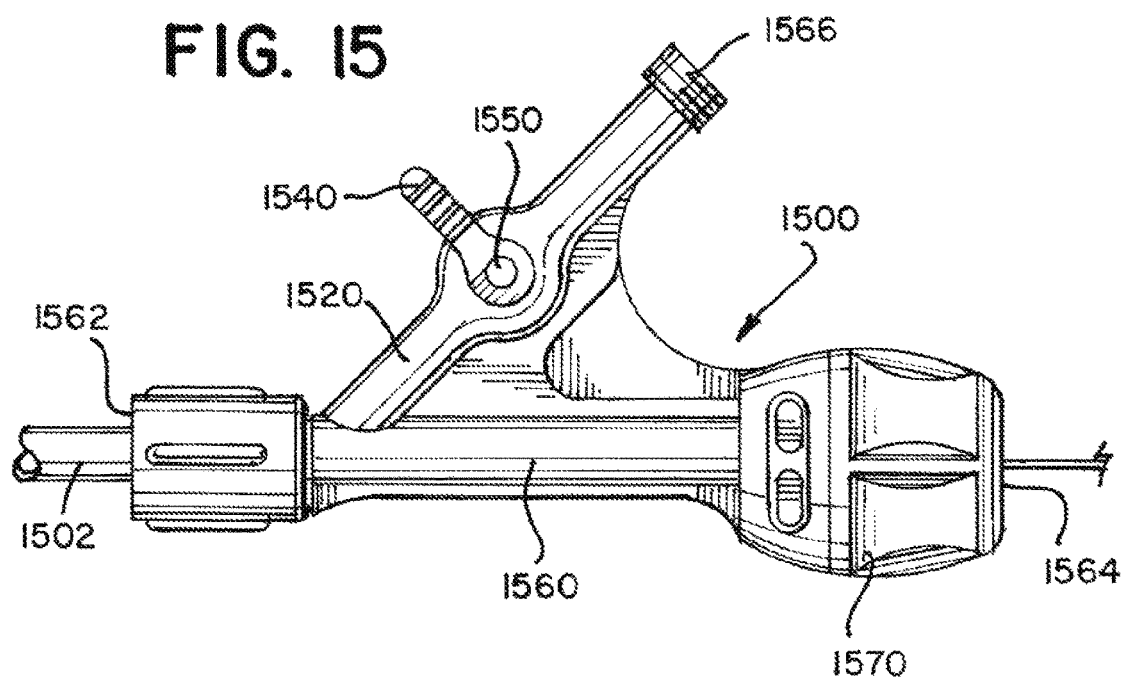
FIG. 15 is an illustration of an aspiration control device controlled by a switch interface according to aspects of the present invention.

FIG. 15 is an illustration of an example system 1500 including an aspiration control device 1520 integrated with a hemostasis valve 1560. The integrated aspiration control device 1520 and hemostasis valve 1560 can be integrated into a common housing. The integrated apparatus can have an entrance 1562 sized to receive and hemostatically seal a catheter 1502, an exit 1564 sized to allow passage of an inner elongated member and hemostatically seal the inner elongated member, an exit locking actuator 1570, a side port 1566 designed to connect with a vacuum system, an aspiration control valve in communication with the side port 1566, and a switch interface 1540 for manipulating the control valve to regulate aspirated blood flow. The control valve can be positioned in a flow path extending from a lumen of the catheter 1502 to the side port 1566, and the control valve can regulate the aspirated blood flow rate through the flow path. The switch interface 1540 can include a lever that is rotatable about a joint 1550 connected to the housing of the apparatus. The control valve can have an opening that is resized as the lever of the switch interface 1540 is rotated about the joint 1550, thereby regulating the aspirated blood flow rate. The lever of the switch interface 1540 can be spring loaded so that it returns to a default position when not being manipulated. Alternatively, the switch interface 1540 can maintain a position to which it was recently moved when not being manipulated.

Figure 16:
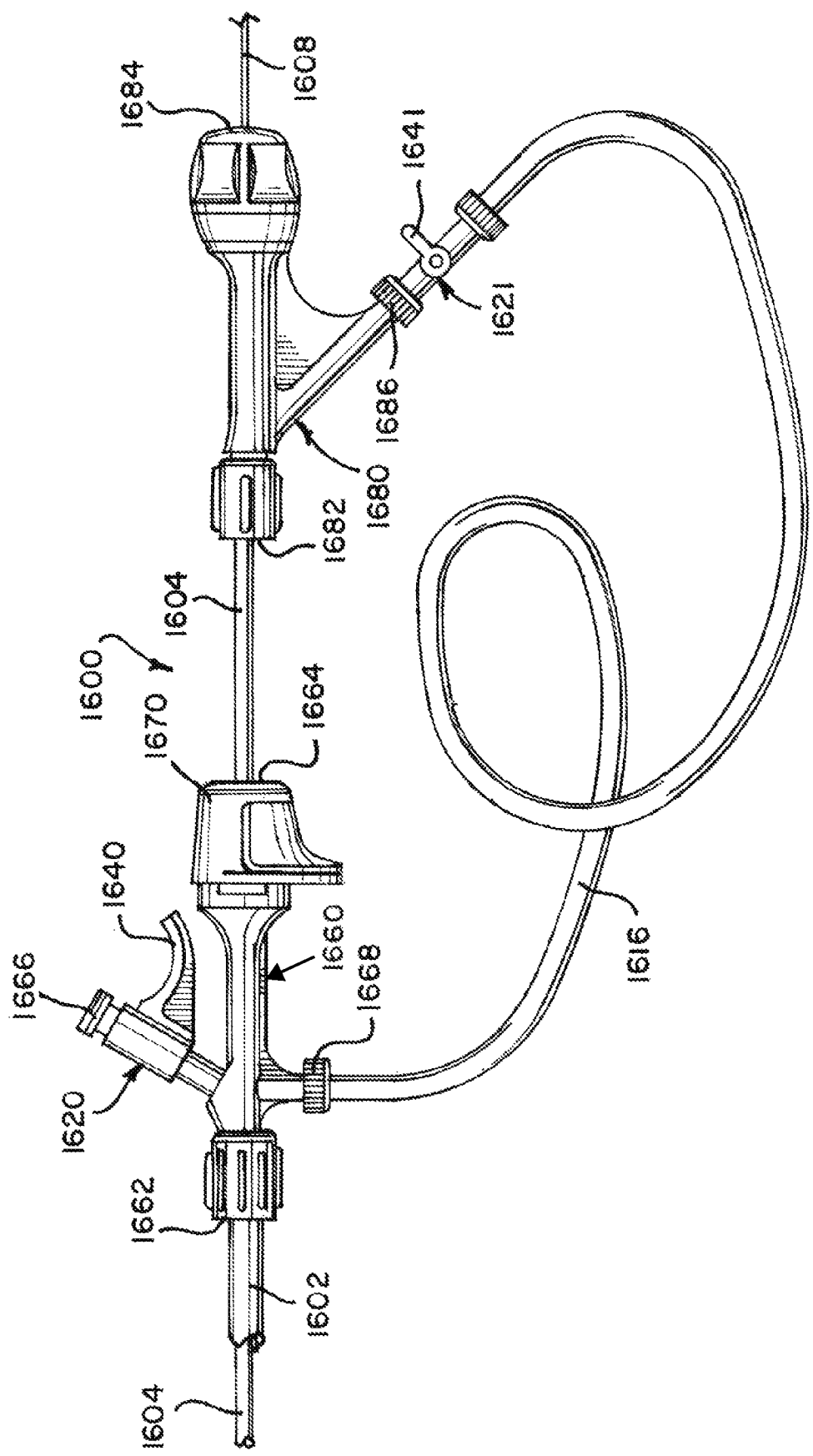
FIG. 16 is an illustration of a system including two aspiration control devices configured to regulate aspiration at two hemostasis valves with only one vacuum source according to aspects of the present invention.

FIG. 16 is an illustration of an example system 1600 including two aspiration control devices 1620, 1621 configured to regulate aspiration through two catheters 1602, 1604 at two hemostasis valves 1660, 1680 with a single vacuum source. The system 1600 can provide suction simultaneously to the two catheters 1602, 1604 from the single vacuum source. Aspiration control devices 1620, 1621 can provide control so that the simultaneous suction provided to each of the catheters 1602, 1604 is different from the other.

The system 1600 can include a first hemostasis valve 1660 having an entrance 1662 sized to receive and hemostatically seal a Guide Catheter 1602, an exit 1664 size to allow passage of an Intermediate Catheter 1604 and hemostatically seal the Intermediate Catheter 1604, a first side port 1666, and a second side port 1668. The system can include a first aspiration control device 1620 positioned to regulate blood flow through a flow path from a lumen of the Guide Catheter 1602 to the first side port 1666 of the first hemostasis valve 1660. The first aspiration control device 1620 can be integrated into a common housing with the first hemostasis valve 1660 and can include a control interface 1640. The first side port 1666 can be connected to a vacuum source. The second side port 1668 can be connected to a tubing 1616. The first hemostasis valve 1660 can include an exit locking actuator 1670 for engaging and sealing the Intermediate Catheter 1604.

The system 1600 can include a second hemostasis valve 1680 having an entrance 1682 positioned to receive the Intermediate Catheter 1604 and hemostatically seal the Intermediate Catheter 1604, an exit 1684 sized to allow passage of an inner elongated member 1608 such as a pull wire or shaft of a thrombectomy device and hemostatically seal the inner elongated member 1608, and a third side port 1686. The system can include a second aspiration control device 1621 positioned to regulate blood flow through a flow path from a lumen of the Intermediate Catheter 1604 to the third side port 1686 and can include a second control interface 1641. The second aspiration control device 1621 can be a stand-alone component connectable to the third side port 1686. Alternatively, the second aspiration control device 1621 can be integrated with the second hemostasis valve 1680. The third side port 1686 can be sized to be connected to the second aspiration control device 1621, and the second aspiration control device 1621 can be connected to the tubing 1616.

The system 1600 can include two flow paths to provide suction to each catheter 1602, 1604 simultaneously. The two flow paths can converge in the control valve of the first aspiration control device 1620 and receive vacuum pressure from a vacuum source connected at the first side port 1666 of the first hemostasis valve 1660. A first flow path can extend from a lumen of the Guide Catheter 1602 to the first side port 1666 of the first hemostasis valve 1660. A second flow path can extend from a lumen of the Intermediate Catheter 1604, through the side port 1686 of the second hemostasis valve 1680 (third side port), through a second control valve of the second aspiration control device 1621, through the tube 1616, through the second side port 1668 of the first hemostasis valve 1660, through the control valve of the first aspiration control device 1620, and to the first side port 1666 of the first hemostasis valve 1660. Because the first and second flow paths converge in the first control valve of the first aspiration control device 1620, the control valve can regulate a first aspirated blood flow rate through the first flow path and a second aspirated blood flow rate through the second flow path. The second aspiration control device 1621 can be manipulated to reduce the suction in the second flow path compared to the first flow path so that the vacuum pressure applied to each flow path are different.

This set up can be particularly advantageous in thrombectomy procedures when an Intermediate Catheter 1604 is used in conjunction with a Guide Catheter or sheath 1602. The second hemostasis valve 1660 with aspiration control 1621 can be connected to the Intermediate Catheter 1604 and the extension tubing 1616 can connect the aspiration flow to the first hemostasis valve 1660 connected to the Guide Catheter or sheath 1602. The single vacuum source connected to the first side port 1666 can facilitate reverse flow through the Guide Catheter 1602 and the Intermediate Catheter 1604 as it is retracted and is particularly valuable to prevent clot embolization as the tip of the Intermediate Catheter 1604 enters the tip of Guide Catheter 1602. This can also be highly beneficial if a stentriever is used in conjunction with the Intermediate Catheter 1604 and Guide Catheter 1602 particularly when the stentriever is partially retrieved into the Intermediate Catheter 1604 and the stentriever and Intermediate Catheter 1604 are retrieved as a single unit such as during the EPIC technique. To facilitate this the vacuum extension tube 1616 can have a greater length than the Intermediate Catheter and may be coiled or extendable for ease of handling. In some thrombectomy procedures, the first hemostasis valve 1660 can be a standard hemostasis valve and need not include additional aspiration control 1620.

The first aspiration control device 1620 and the second aspiration device 1621 can be designed according to examples and principles disclosed herein and need not be specifically designed as illustrated in FIG. 16.

Figure 17:
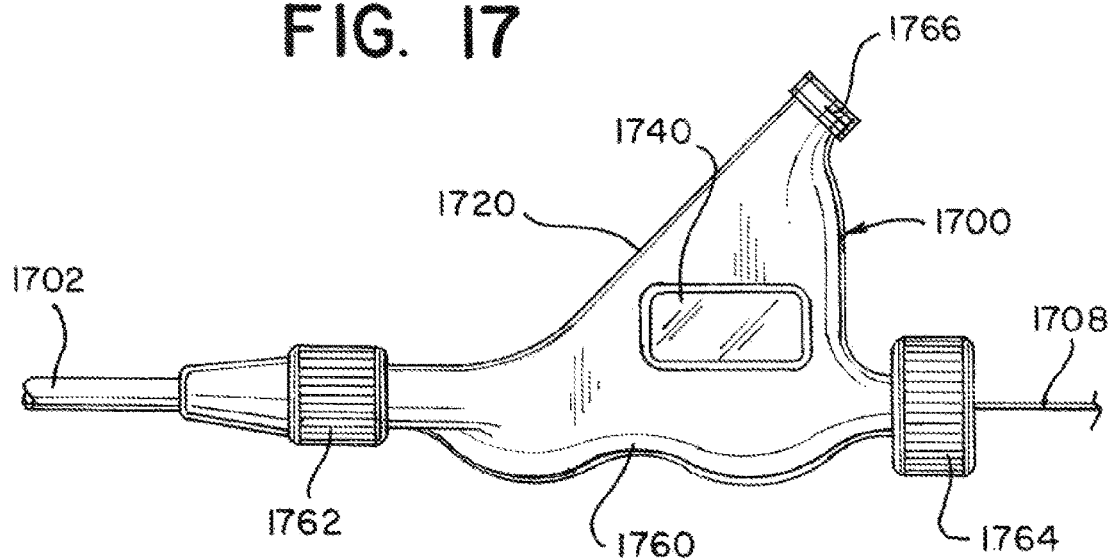
FIG. 17 is an illustration of an aspiration control device with an electrical actuation interface.

FIG. 17 is an illustration of an example system 1700 including an aspiration control device 1720 that includes an electrical actuator. As illustrated, the aspiration control device 1720 can be integrated into the hemostasis valve 1760. The integrated aspiration control device 1720 and hemostasis valve 1760 can be integrated into a common housing. The integrated apparatus can have an entrance 1762 sized to receive and hemostatically seal a catheter 1702, an exit 1764 sized to allow passage of an inner elongated member 1708 and hemostatically seal the inner elongated member 1708, a side port 1766 designed to connect with a vacuum system, an aspiration control valve in communication with the side port 1766, and a control interface 1740 for manipulating the control valve to regulate aspirated blood flow. The control valve can be positioned in a flow path extending from a lumen of the catheter 1702 to the side port 1766, and the control valve can regulate an aspirated blood flow rate through the flow path. Although not illustrated, it is contemplated that an external aspiration control device 120 such as illustrated in FIG. 1 could include an electrical interface.

The control valve can have an opening that is sized depending on an electrically actuated mechanism such as a motor. The electrical actuator can be programmed to have a set of flow rates and/or predetermined sequences of valve opening positions that a physician can select via the interface 1740. When the electrical actuator is activated, the opening of the control valve can be sized based on the selected program.

In some examples, the program can include specific waveforms or flow patterns. In some applications, it can be advantageous to pulsatile or vary vacuum rates to increase the likelihood that the catheter can fully aspirate the clot, or if the clot has a high fibrin content and cannot be fully aspirated, the pulsatile vacuum can allow the catheter to obtain an improved grip on the clot. This can be beneficial when the aspiration control valve is used with a Balloon Guide Catheter, Guide Sheath, Intermediate or other catheter used in a thrombectomy procedure.

The control interface 1740 can include mechanisms for selecting a program for the electrical actuator and activating the electrical actuator to execute the program. The interface 1740 include mechanical inputs that can be manipulated by a physician to activate the electrical actuator such a slider, push button, switch, wheel, trigger, grip, lever, rotating valve, handle, and/or other mechanism such as described in relation to mechanically controlled aspiration control valve. Additionally, or alternatively, the interface 1740 can include a touch screen, touch pad, multiple push buttons, textual and/or video display, or other type of electrical device user interface.

Figure 20:
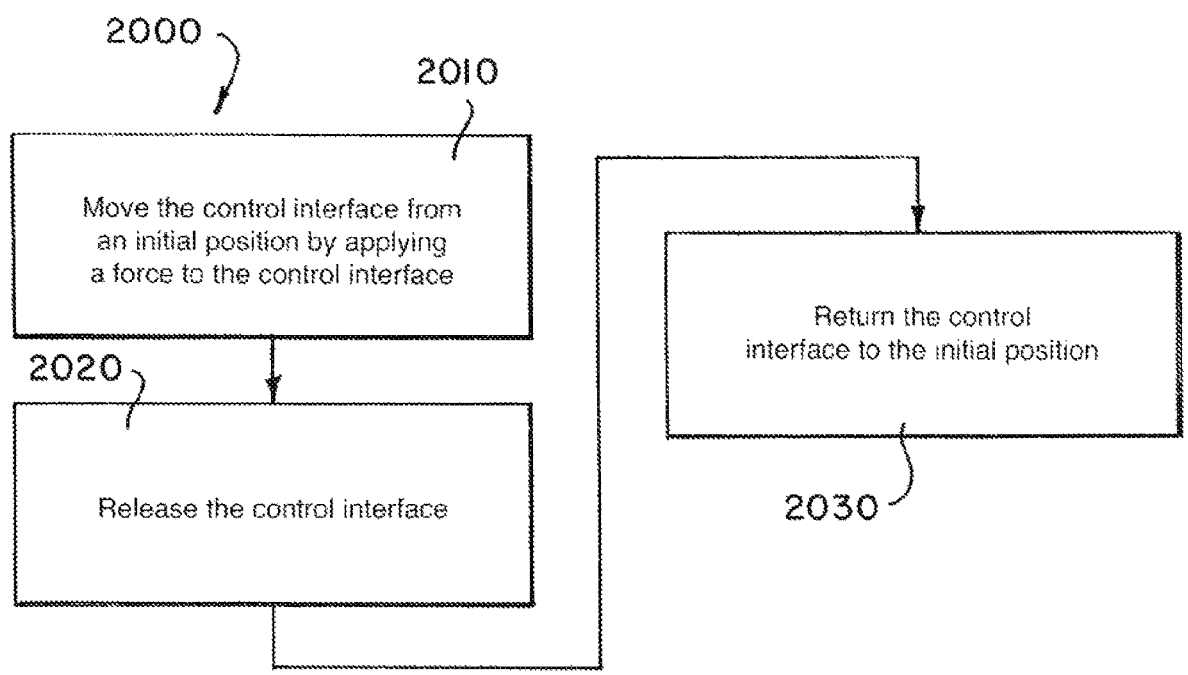
Figure 18:
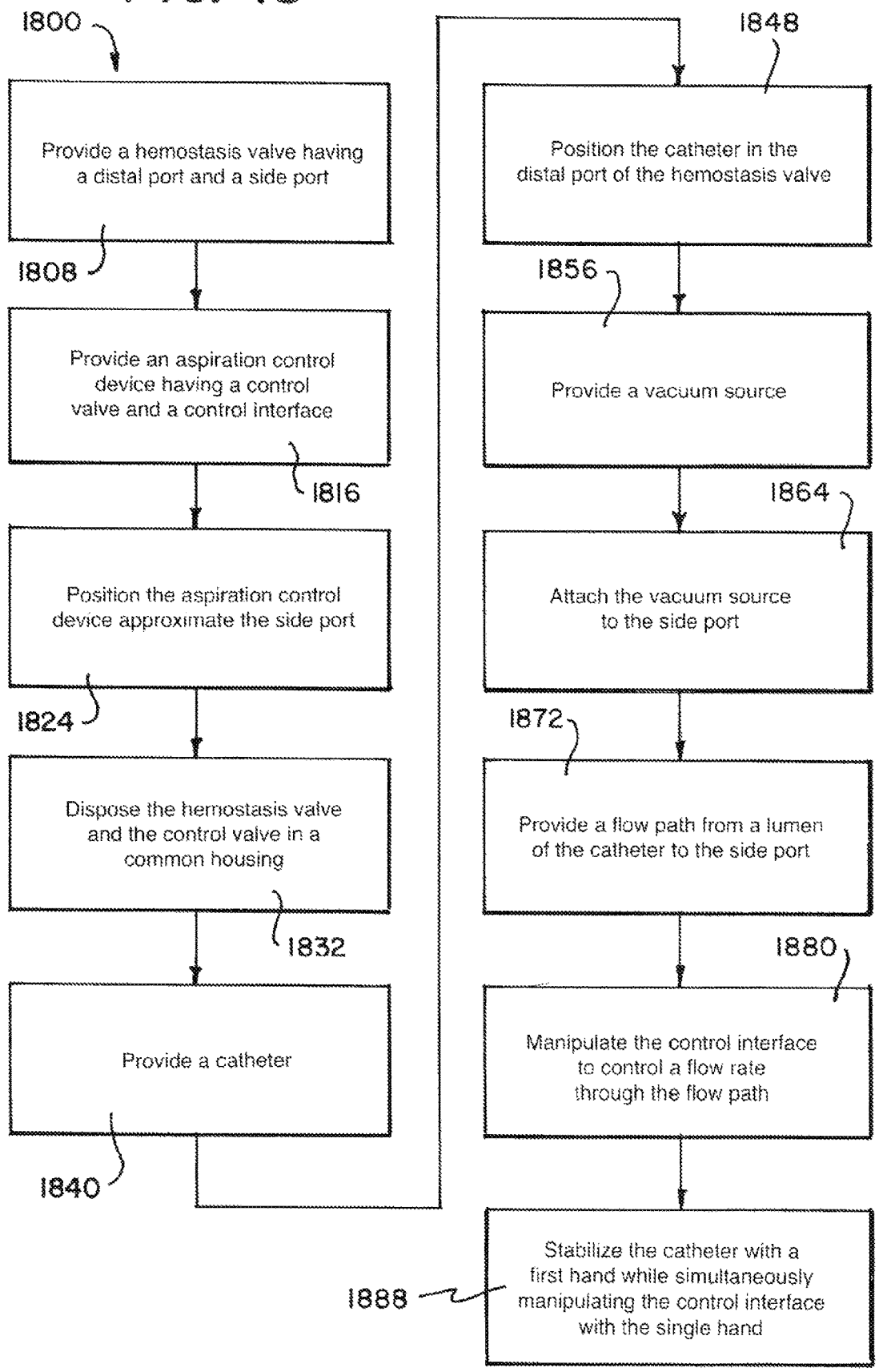

FIGS. 18 through 20 are flow diagrams each including method steps for controlling aspiration during an intravascular treatment. FIG. 21 is a flow diagram including method steps for a clot retrieval treatment. The method steps can be implemented by any of the example systems, devices, and/or apparatus described herein or by a means that would be known to one of ordinary skill in the art. Method steps from one or more methods 1800, 1900, 2000, 2100 can be combined.

Referring to a method 1800 outlined in FIG. 18, in step 1808 a hemostasis valve can be provided having a distal port and a side port. In step 1816, an aspiration control device having a control valve and a control interface can be provided. In step 1824, the aspiration control device can be positioned approximate the side port. In step 1832, the hemostasis valve and the control valve can be disposed in a common housing. In step 1840, a catheter can be provided. In step 1848, the catheter can be positioned in the distal port of the hemostasis valve. In step 1856, a vacuum source can be provided. In step 1864, the vacuum source can be attached to the side port. In step 1872, a flow path can be provided extending from a lumen of the catheter to the side port. In step 1880, the control interface can be manipulated to control a flow rate through the flow path. In step 1888, the catheter can be stabilized, and the control interface can be manipulated simultaneously with a single hand.

Referring to a method 1900 outlined in FIG. 19, in step 1910 the control valve of the aspiration control device can be positioned in the flow path. In step 1920, a flexible tubing having an opening can be positioned in the flow path. In step 1930, a housing having an opening can be provided. In step 1940, the flexible tubing can be positioned in the housing. In step 1950, a compression element in communication with the control interface can be provided. In step 1960, the compression element can be positioned to engage the flexible tubing. In step 1970, the compression element can be positioned in the opening in the housing. In step 1980, the compression element can be moved to resize the opening in the flexible tubing by manipulating the control interface.

Referring to a method 2000 outlined in FIG. 20, in step 2010 the control interface can be moved from an initial position by applying a force to the control interface. In step 2020, the control interface can be released. In step 2030, the control interface can be returned to the initial position.

Referring to a method 2100 outlined in FIG. 21, some or all of the steps can be performed by a physician using example systems 100, 200, 300, 400, 500, 600, 800, 900, 1000, 1100, 1100a, 1200, 1400, 1500, 1600, 1700 illustrated herein, variations thereof, and systems having equivalent functionality together with a Balloon Guide Catheter, microcatheter, and clot retriever device to remove a clot from the Neurovasculature.

In step 2102, a Balloon Guide Catheter can be positioned within a patient. The Balloon Guide Catheter can be positioned through known procedures, for example by first positioning a guide wire within the patient, pushing the Balloon Guide Catheter into the patient over the guide wire and dilator or access catheter as appropriate, and removing the guide wire and Access Catheters. The Balloon Guide Catheter can have an inflatable balloon near its distal end that can be inflated during the thrombectomy to inhibit proximal blood flow. The Balloon Guide Catheter can have a lumen for receiving one or more catheters and/or other devices as needed. The distal end of the Balloon Guide Catheter can be positioned in the Internal Carotid Artery or near the clot on the proximal side of the clot.

In step 2104, the Balloon Guide Catheter can be attached to the entrance of a hemostasis valve. The hemostasis valve can be one of the example hemostasis valves described and illustrated herein, a variation thereof, or a hemostasis valve having equivalent functionality.

In step 2106, a microcatheter and clot retriever device can be positioned for treatment. The microcatheter can be positioned such that a distal portion of the microcatheter passes the clot, a majority of the length of the microcatheter passes through the Balloon Guide Catheter, the microcatheter passes through the entrance of the hemostasis valve, and the proximal end of the microcatheter is positioned in the hemostasis valve. While the microcatheter is being positioned, a valve at the entrance of the hemostasis valve can be fully open. The clot retriever device can be introduced through the microcatheter after the microcatheter is positioned across the clot using standard interventional techniques. The portion of the clot retriever that is configured to expand within the clot can be positioned in the portion of the microcatheter that is positioned within the clot. The valve at the entrance of the hemostasis valve can be locked to the microcatheter while the clot retriever device is fed into the microcatheter.

In step 2108, the clot retriever can be deployed. To deploy the clot retriever, the microcatheter can be retracted such that the distal end of the microcatheter is on the proximal side of the clot while the clot retriever maintains its position within the clot. In this way, the clot retriever can be unsheathed, and once unsheathed, can expand within the clot. While the microcatheter is being retracted, the valve at the entrance of the hemostasis valve can be locked to a mid-position around the microcatheter to minimize blood loss.

In step 2110, an aspiration control valve at a side port of the hemostasis valve can be closed. The aspiration control valve can be integral to the hemostasis valve or can be attached to the side port as described and illustrated in the examples herein, variations thereof, or an aspiration control valve having equivalent functionality.

In step 2112, a vacuum can be created at the side port. The vacuum can be created by attaching a luerloc syringe at the side port and retracting its plunger, by connecting a vacuum pump, or other means. The closed aspiration control valve can prevent flow through the side port.

In some procedures it can be advantageous to close the aspiration control valve and create the vacuum as described in steps 2110 and 2112 prior to any of the steps 2102, 2104, 2106, or 2108, or after step 2108. A physician can choose an order that makes the system easier to handle based on their own preference. In any case, the aspiration control valve is preferably closed before vacuum is applied at the side port to prevent premature aspiration.

In step 2114, the aspiration control valve can be opened to a low flow position. The aspiration control valve can be opened by manipulating a control interface, actuator, trigger, slider, lever, or other interface as described and illustrated in the examples herein, variations thereof, and aspiration control valves having equivalent functionality. Prior to the aspiration valve being opened, a balloon on the Balloon Guide Catheter can be inflated to occlude blood flow within the vessel of the patient.

When the aspiration control valve is open, blood can flow from within the vessel of the patient and into the Balloon Guide Catheter, pulling free thrombus into the catheter. Alternatively, or additionally, the Balloon Guide Catheter can be configured to occlude the vessel to provide the reverse blood flow improving the efficacy of the clot retrieval device to dislodge and retrieve the thrombus fully in step 2116.

In step 2118, after the clot retriever device has been partially retracted (e.g. past the Internal Carotid Artery terminus), the aspiration control device can be manipulated to increase the flow rate to a medium flow rate into the syringe, pump, or other vacuum source.

In step 2120, after the clot retriever device has been further retracted (e.g. as the clot retriever device nears the distal end of the Balloon Guide Catheter), the aspiration control device can be manipulated to allow a high flow rate.

In step 2122, while the aspiration control device is set to allow the highest flow rate, the clot retriever device can be retracted into the Balloon Guide Catheter. In steps 2118 through 2122, the microcatheter can be retracted together with the clot retriever device.

In procedures where an Intermediate Catheter or Distal Access Catheter is used to aspirate clot without the use of an additional clot retriever device, for example in the A Direct Aspiration First Pass Technique (ADAPT) technique, the example valve systems described herein can be used to control or modulate the vacuum applied to the catheter via the vacuum pump or syringe. The aspiration control valve can be used to give the physician an ergonomic and easy way to control the aspiration flow while maintaining control of the catheter and without leaving the side of the patient to modify the pump settings.

The descriptions contained herein are examples of embodiments of the invention and are not intended in any way to limit the scope of the invention. As described herein, the invention contemplates many variations and modifications of the systems and devices for aspirating blood flow, including integrating an aspiration control device with another other treatment device, attaching an aspiration control device to another traditional treatment device, utilizing one or more aspiration control devices to control flow rate through one or more flow paths, using various configurations of a control valve, using various configurations of a control interface, utilizing various combinations of components to achieve described functionality, utilizing alternative materials to achieve described functionality, combining components from the various examples, combining components from the various example with known components, etc. The invention contemplates substitutions of component parts illustrated herein with known component parts including known control valves, control interfaces, indicators, etc. These modifications would be apparent to those having ordinary skill in the art to which this invention relates and are intended to be within the scope of the claims which follow.

What is claimed is:

1. An apparatus comprising:
   a first hemostasis valve comprising:
      an entrance configured to open to receive a first catheter and close to hemostatically seal and grip an exterior perimeter of the first catheter,
      an exit configured to open to receive a second catheter and close to hemostatically seal and grip an exterior perimeter of the second catheter, and
      a first side port;
      a second side port;
   a control valve in communication with the first hemostasis valve via the first side port, the control valve comprising a tubing; and
   a control interface in communication with the control valve, the control interface comprising a compression element,
   wherein the tubing of the control valve is compressible to restrict a flow through the tubing from a first flow rate to a second flow rate upon manipulation by the control interface;
   a second hemostasis valve comprising:
      an entrance configured to open to receive the second catheter and close to hemostatically seal and grip the exterior perimeter of the second catheter such that the first hemostasis valve is in communication with the second hemostasis valve,
      an exit sized to pass an inner elongated member disposed within a lumen of the second catheter and configured to seal the inner elongated member against air ingress during aspiration when the inner elongated member is retracted, and
      a side port in the second hemostasis valve; and
   a second tube having a first end and a second end, the first end of the second tube being directly connected to the second side port in the first hemostasis valve, the second end of the second tube being directly connected to the side port in the second hemostasis valve such that the second hemostasis valve is in direct communication with the first hemostasis valve by the second tube, wherein the apparatus includes a first flow path and a second flow path, the first flow path being from a lumen of the first catheter through the control valve through the first side port of the first hemostasis valve, the second flow path being from a lumen of the second catheter through the side port of the second hemostasis valve through the second tube through the second side port of the first hemostasis valve through the control valve and through the first side port in the first hemostasis valve.

2. The apparatus of claim 1, wherein the control valve, the control interface, and the first hemostasis valve are affixed to a common housing.

3. The apparatus of claim 1, wherein the control interface is positioned to allow a user to select one of the first flow rate or the second flow rate with a single hand while stabilizing the first catheter with the single hand.

4. The apparatus of claim 1, wherein the control interface is movable to select at least one of the first flow rate or the second flow rate based at least in part on a force applied to the control interface.

5. The apparatus of claim 1, wherein an opening of the tubing is movable through a continuum of dimensions between a first dimension and a second dimension such that a flow of aspirated blood is controllable over a continuum of flow rates between the first flow rate and the second flow rate.

6. The apparatus of claim 1, wherein the control valve is programmed to provide a first waveform of aspiration, the first waveform of aspiration comprising a pulsatile vacuum pattern.

7. The apparatus of claim 1, further comprising a vacuum source connected to the first side port in the first hemostasis valve.

* * * * *